US012562624B2

(12) United States Patent
Fu et al.

(10) Patent No.: US 12,562,624 B2
(45) Date of Patent: Feb. 24, 2026

(54) ELECTRIC PUMP

(71) Applicant: ZHEJIANG SANHUA AUTOMOTIVE COMPONENTS CO., LTD., Zhejiang (CN)

(72) Inventors: Binhao Fu, Zhejiang (CN); Ying Zhang, Zhejiang (CN); Jun Zhang, Zhejiang (CN); Yongfeng Sun, Zhejiang (CN); Longji Cai, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 313 days.

(21) Appl. No.: 17/928,668

(22) PCT Filed: Jul. 2, 2021

(86) PCT No.: PCT/CN2021/104131
§ 371 (c)(1),
(2) Date: Nov. 30, 2022

(87) PCT Pub. No.: WO2022/002222
PCT Pub. Date: Jan. 6, 2022

(65) Prior Publication Data
US 2023/0216381 A1 Jul. 6, 2023

(30) Foreign Application Priority Data

Jul. 3, 2020 (CN) .......................... 202010634847.0

(51) Int. Cl.
| | |
|---|---|
| *H02K 11/02* | (2016.01) |
| *F04D 13/06* | (2006.01) |
| *H02K 11/01* | (2016.01) |

(52) U.S. Cl.
CPC ............. *H02K 11/02* (2013.01); *F04D 13/06* (2013.01); *H02K 11/01* (2016.01); *H02K 11/014* (2020.08)

(58) Field of Classification Search
CPC ........ H02K 11/02; H02K 5/12; H02K 11/014; H02K 3/522; H02K 1/12; H02K 11/01; H02K 44/02; F04D 13/06; F04D 13/064
See application file for complete search history.

(56) References Cited

U.S. PATENT DOCUMENTS

| | | | |
|---|---|---|---|
| 4,528,473 | A | 7/1985 | Tezuka |
| 2003/0052568 | A1 | 3/2003 | Howard |

(Continued)

FOREIGN PATENT DOCUMENTS

| | | | | |
|---|---|---|---|---|
| CN | 205105018 | U | 3/2016 | |
| CN | 107346928 | A * | 11/2017 | ......... H02K 15/0068 |

(Continued)

OTHER PUBLICATIONS

Bennett, Types of Snap Fit Joints and Best Design Practices, Published Aug. 9, 2024 (Year: 2025).*

(Continued)

*Primary Examiner* — Dominick L Plakkoottam
(74) *Attorney, Agent, or Firm* — Ohlandt, Greeley and Perle, LLP.

(57) ABSTRACT

An electric pump includes a stator assembly. The stator assembly includes a stator core and a winding. The winding includes a main body section, a first section, and a second section. The stator core includes a core tooth portion, a core yoke portion, and a core neck portion. A first reference plane is defined, which coincides with a center axis line of the core tooth portion in an axial direction thereof and a center axis line of the core neck portion in an axial direction thereof. In a cross section of the stator assembly along the first refer- (Continued)

ence plane, an upper end of the main body section is level with an upper end of a main body portion of the core yoke portion, and a lower end of the main body section is level with a lower end of the main body portion of the core yoke portion.

16 Claims, 18 Drawing Sheets

(56)                    References Cited

U.S. PATENT DOCUMENTS

| | | | | |
|---|---|---|---|---|
| 2017/0126089 | A1* | 5/2017 | Bao | H02K 5/10 |
| 2017/0288485 | A1* | 10/2017 | Bastien | H02K 1/2773 |
| 2017/0288486 | A1* | 10/2017 | Hoemann | H02K 1/2773 |
| 2018/0163721 | A1* | 6/2018 | Takahashi | F04B 53/00 |
| 2019/0353168 | A1* | 11/2019 | Fujikawa | F04C 15/008 |
| 2019/0356201 | A1* | 11/2019 | Li | H02K 11/40 |
| 2020/0067381 | A1* | 2/2020 | Suzuki | H02K 11/33 |
| 2020/0177048 | A1* | 6/2020 | Schroth | H02K 5/1732 |
| 2020/0204021 | A1* | 6/2020 | Kim | H02K 9/19 |
| 2021/0003132 | A1* | 1/2021 | Imai | F04D 29/628 |
| 2021/0095651 | A1* | 4/2021 | Yin | H02K 5/225 |
| 2021/0305884 | A1* | 9/2021 | Takahashi | H02K 11/0141 |
| 2021/0376685 | A1 | 12/2021 | Hacklberger et al. | |

FOREIGN PATENT DOCUMENTS

| | | | |
|---|---|---|---|
| CN | 207677589 U | | 7/2018 |
| CN | 209709795 U | * | 11/2019 |
| CN | 110829665 A | | 2/2020 |
| FR | 3043278 A1 | | 5/2017 |
| JP | S59135087 U | | 9/1984 |
| JP | H04344150 A | | 11/1992 |
| JP | 2005-033947 A1 | | 2/2005 |
| JP | 2014-092084 A | | 5/2014 |
| JP | 6562702 B2 | * | 8/2019 |
| WO | 2020094513 A1 | | 5/2020 |

OTHER PUBLICATIONS

International Search Report dated Sep. 24, 2021 for PCT Appl. No. PCT/CN2021/104131.
Japanese Office Action (with English translation) dated Dec. 5, 2023 for Japanese Appl. No. 2022-578669.
European Search Report dated Jul. 17, 2024 for European Application No. 21831679.2.

* cited by examiner

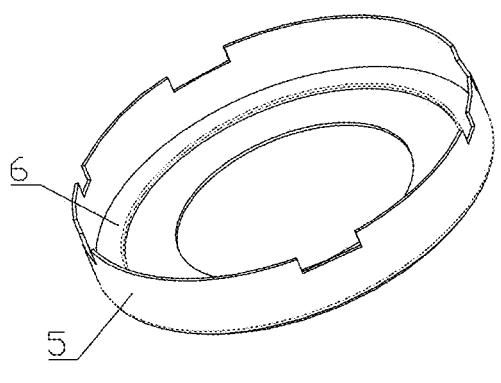
FIG. 9
FIG. 10
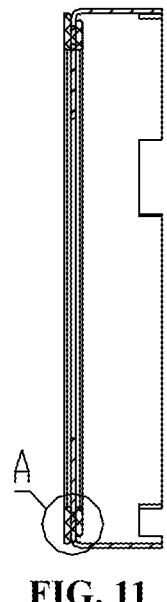
FIG. 11

ELECTRIC PUMP

The present application is the national phase of International Patent Application No. PCT/CN2021/104131, titled "ELECTRIC PUMP", filed on Jul. 2, 2021, which claims the priority to Chinese Patent Application No. 202010634847.0, titled "ELECTRIC PUMP", filed with the China National Intellectual Property Administration on Jul. 3, 2020, both of which are incorporated herein by reference.

FIELD

The present application relates to a fluid pump, and in particular to an electric pump.

BACKGROUND

An electric pump includes a stator assembly. Generally, a winding in the stator assembly is energized during the use of the electric pump, and the winding in the stator assembly generates electromagnetic waves, which may interfere with other external components, and may further affect the performance of other external components. Therefore, how to reduce the interference of the electric pump on the external environment is a technical problem that needs to be considered.

SUMMARY

An object according to the present application is to provide an electric pump which is beneficial to reducing the interference of the electric pump on the external environment.

In order to achieve the above object, the following technical solution is provided according to an embodiment of the present application.

An electric pump includes a stator assembly, where the stator assembly includes a stator iron core and a winding, where the winding includes a main body section, a first section and a second section, where the first section is connected to the second section by the main body section, and the first section is located above the second section; the stator iron core includes an iron core toothed portion, an iron core yoke portion and an iron core neck portion, where the iron core toothed portion is connected to the iron core yoke portion by the iron core neck portion, the iron core yoke portion is farther away from a center axis of the stator iron core than the iron core toothed portion, the iron core yoke portion is located on an outer circumference of the winding, and the iron core neck portion is configured to provide support for the winding to wind; an upper end of the main body section is flush with an upper end of a body portion of the iron core yoke portion, and a lower end of the main body section is flush with a lower end of the body portion of the iron core yoke portion; the electric pump further includes a shield member, where the shield member is made of a conductive metal, and at least part of the shield member is located on an outer circumference of at least one of the first section and the second section.

In the technical solution provided according to the present application, the electric pump further includes the shield member, the shield member is made of a conductive metal, and at least part of the shield member is located on the outer circumference of at least one of the first section and the second section. With the above configuration, the shield member can absorb and reflect the electromagnetic waves generated by the winding during the use of the electric pump, which is beneficial to reducing the electromagnetic waves radiated to the external environment from the first section and/or the second section of the winding, and is therefore beneficial to reducing the interference of the electric pump on the external environment.

BRIEF DESCRIPTION OF THE DRAWINGS

FIG. 9 is a schematic perspective view of an assembly of the shield member, the first elastic pad and the second elastic pad in FIG. 1 or FIG. 3 viewed from another perspective;

FIG. 10 is a schematic front view of an assembly of the shield member, the first elastic pad and the second elastic pad in FIG. 8 or FIG. 9;

FIG. 11 is a schematic cross-sectional view of an assembly of the shield member, the first elastic pad and the second elastic pad in FIG. 10 taken along line A-A;

DETAILED DESCRIPTION OF THE EMBODIMENTS

The present application is further illustrated hereinafter in conjunction with drawings and specific embodiments.

The specific embodiments of the present application are described in detail hereinafter in conjunction with the drawings. First of all, it should be noted that the positional terms such as "up", "down", "left", "right", "front", "back", "inside", "outside", "top", "bottom", "high" and "low" mentioned or possibly mentioned herein are defined relative to the structure shown in the corresponding drawing, which are relative concepts, and may change accordingly according to their different positions and different use states. Therefore, these and other positional terms should not be construed as restrictive terms.

A fluid drive device in the following embodiments enables a working medium of a vehicle thermal management system to flow, where the working medium may be water or an aqueous solution, such as an aqueous solution containing 50% ethylene glycol. Alternatively, the working medium may also be other substance.

Figure 1:
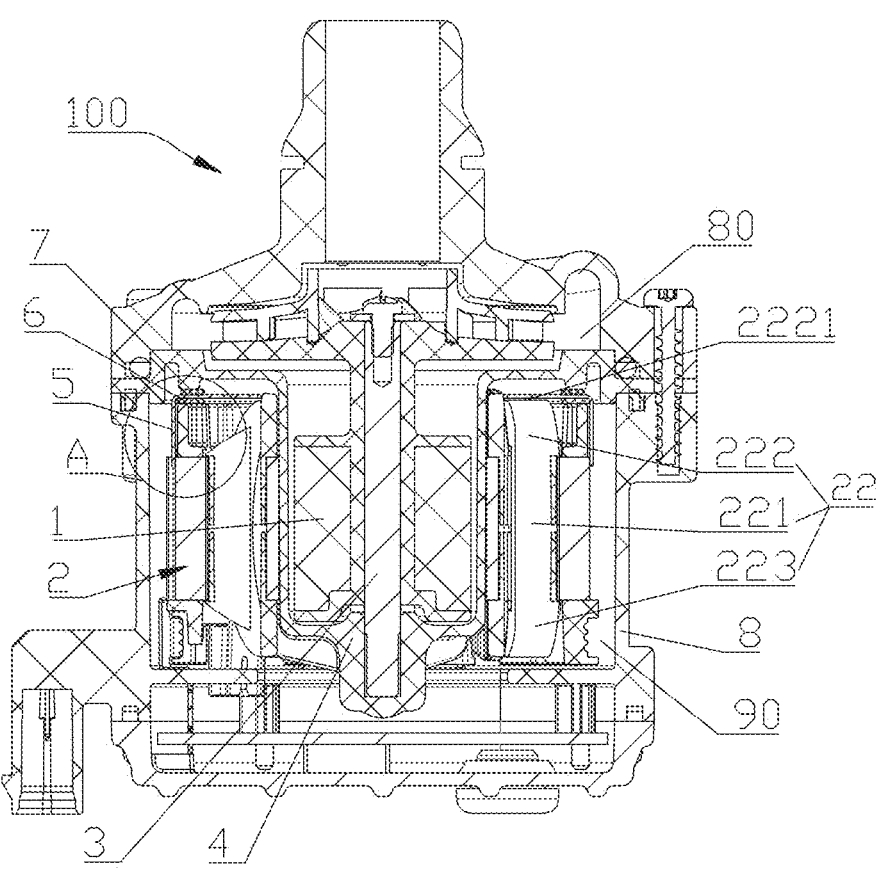
FIG. 1 is a schematic cross-sectional view of a first embodiment of an electric pump provided according to the present application.
Figure 3:
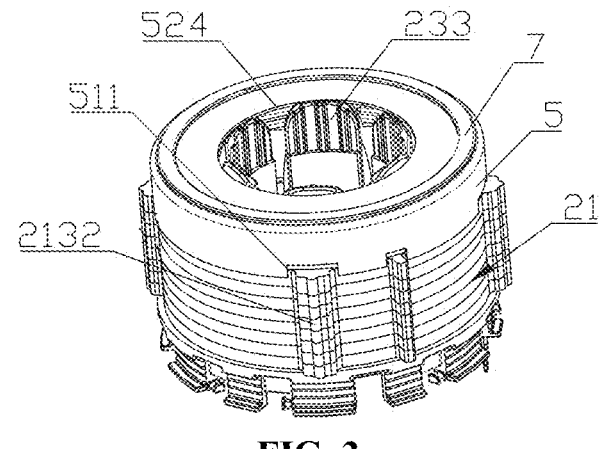
FIG. 3 is a schematic perspective view of an assembly of a stator assembly, a shield member, a first elastic pad and a second elastic pad in FIG. 1.

Referring to FIG. 1, an electric pump 100 includes a pump housing, a rotor assembly 1, a stator assembly 2, a pump shaft 3 and an isolation portion 4, where the rotor assembly 1 is sleeved on an outer circumference of the pump shaft 3. The electric pump 100 includes a pump inner chamber, where the pump inner chamber is separated into a first chamber 80 and a second chamber 90 by the isolation portion 4, the working medium can flow through the first chamber 80, and the second chamber 90 is not in direct contact with the working medium, where the rotor assembly 1 is located in the first chamber 80, and the stator assembly 2 is located in the second chamber 90. Referring to FIG. 1 and FIG. 3, the stator assembly 2 includes a stator iron core 21, an insulating frame 23 and a winding 22, where the insulating frame 23 covers on at least part of a surface of the stator iron core 21, and the winding 22 and the stator iron core 21 are spaced apart by part of the insulating frame 23, so that the provision of the insulating frame 23 between the winding 22 and the stator iron core 21 can prevent electricity conduction between the stator iron core 21 and the winding 22. An excitation magnetic field generated by the stator assembly 2 is controlled by controlling a current passing through the winding 22 of the stator assembly 2 during the operation of the electric pump 100, and the rotor assembly 1 rotates around or together with the pump shaft 3 under the action of the excitation magnetic field.

Figure 4:
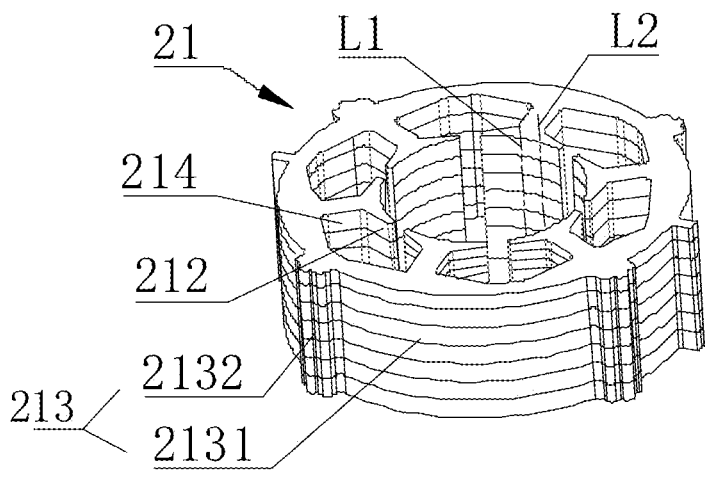
FIG. 4 is a schematic perspective view of the stator assembly in FIG. 1 viewed from one perspective.

Referring to FIG. 1, the winding 22 includes a main body section 221, a first section 222 and a second section 223, where the first section 222 is connected to the second section 223 by the main body section 221, and the first section 222 is located above the second section 223. Referring to FIG. 1 and FIG. 4, the stator iron core 21 includes an iron core toothed portion 212, an iron core yoke portion 213 and an iron core neck portion 214, where the iron core toothed portion 212 is connected to the iron core yoke portion 213 by the iron core neck portion 214, the iron core yoke portion 213 is farther away from a center axis of the stator iron core 21 than the iron core toothed portion 212 along a radial direction of the stator iron core 21, and the iron core yoke portion 213 is located on an outer circumference of the winding 22. A first reference plane is defined, and the first reference plane coincides with an axial center axis L1 of the iron core toothed portion 212 and an axial center axis L2 of the iron core neck portion 214. A cross section of the stator assembly is taken along the first reference plane, an upper end of a cross section of the main body section 221 is flush with an upper end of a cross section of a body portion of the iron core yoke portion 213, and a lower end of the cross section of the main body section 221 is flush with a lower end of the cross section of the body portion of the iron core yoke portion 213, so that the iron core yoke portion 213 can absorb and reflect the electromagnetic waves radiated toward the iron core yoke portion 213 from the main body section 221 of the winding, which is beneficial to reducing the electromagnetic waves radiated to an external environment from the main body section 221 of the winding, and further reducing the interference of the electric pump on the external environment. The above body portion of the iron core yoke portion 213 can make reference to the description below. Herein, for the convenience of description, the winding 22 is divided into three sections. In fact, the winding 22 is formed by winding at least one enameled wire.

Figure 5:
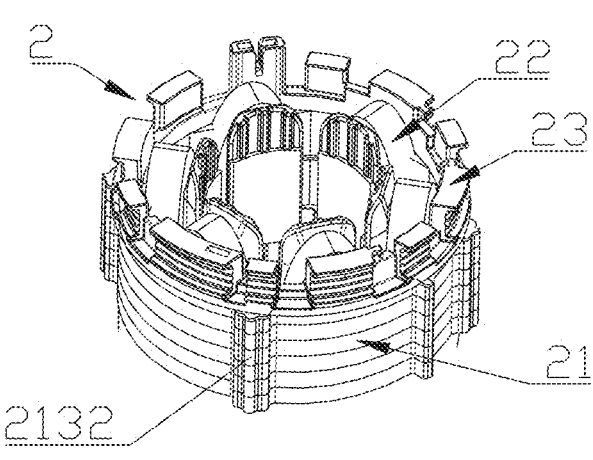
FIG. 5 is a schematic perspective view of the stator assembly in FIG. 1 viewed from another perspective.
Figure 6:
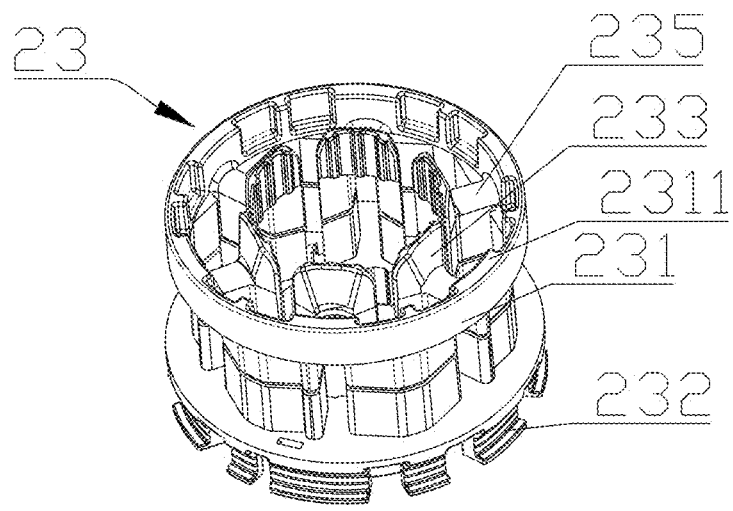
FIG. 6 is a schematic perspective view of an insulating frame in FIG. 4 or FIG. 5 viewed from one perspective.
Figure 7:
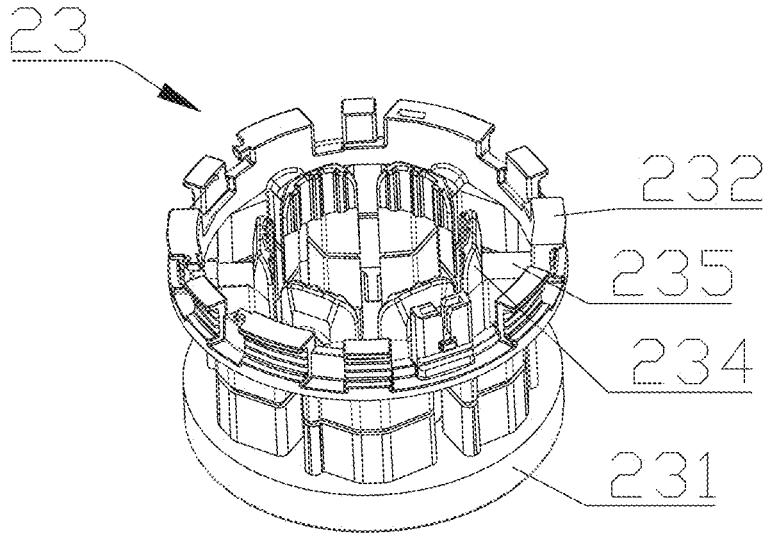
FIG. 7 is a schematic perspective view of the insulating frame in FIG. 4 or FIG. 5 viewed from another perspective.
Figure 8:
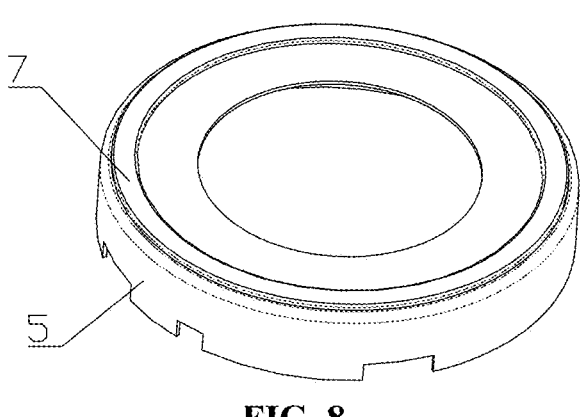
FIG. 8 is a schematic perspective view of an assembly of the shield member, the first elastic pad and the second elastic pad in FIG. 1 or FIG. 3 viewed from one perspective.
Figure 12:
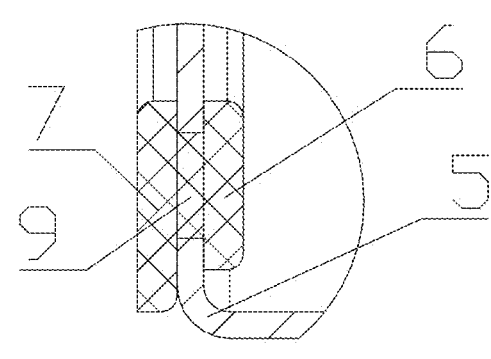
FIG. 12 is a schematic enlarged view of portion A in FIG. 11.

Referring to FIG. 6 and FIG. 7, the insulating frame 23 includes a first blocking portion 231, a second blocking portion 232 and a winding portion 235, where the first blocking portion 231, the stator iron core 21 and the second blocking portion 232 are distributed along an axial direction of the electric pump 100, the winding portion 235 is configured to provide support for the winding 22 to wind, the winding portion 235 is closer to a center axis of the stator assembly 2 than the first blocking portion 231 and the second blocking portion 232, an upper end surface of the first blocking portion 231 is higher than the top of the winding portion 235, and a lower end surface of the second blocking portion 232 is lower than the bottom of the winding portion 235, which is beneficial to preventing the winding from separating from the winding portion 235 from the sides where the first blocking portion 231 and the second blocking portion 232 are located during the winding of the winding. In this embodiment, the stator iron core 21 is located between the first blocking portion 231 and the second blocking portion 232, the first blocking portion 231 is located on one side of the stator iron core 21, the second blocking portion 232 is located on another side of the stator iron core 21, and the side where the first blocking portion 231 is located and the side where the second blocking portion 232 is located are different sides of the stator iron core 21. Referring to FIGS. 3 to 5, an outer circumferential surface of the stator iron core 21 is completely exposed. Alternatively, part of the first blocking portion 231 and the second blocking portion 232 may cover on the outer circumferential surface of the stator iron core 21, and only part of the outer circumferential surface of the stator iron core 21 is exposed in this case, or the whole outer circumferential surface of the stator iron core 21 is covered by the first blocking portion 231 and/or the second blocking portion 232. Referring to FIG. 6 and FIG. 7, the insulating frame 23 further includes a third blocking portion 233 and a fourth blocking portion 234, where the top of the winding portion 235 is connected to the first blocking portion 231 and the third blocking portion 233, and the bottom of the winding portion 235 is connected to the second blocking portion 232 and the fourth blocking portion 234, where the third blocking portion 233 and the first blocking portion 231 are located on a same side, the fourth blocking portion 234 and the second blocking portion 232 are located on a same side, and the third blocking portion 233 and the fourth blocking portion 234 are closer to the center axis of the stator assembly 2 than the winding portion 235. With the view of FIG. 6 as a reference, an upper end surface of the third blocking portion 233 is higher than the top of the winding portion 235, and a lower end surface of the fourth blocking portion 234 is lower than the bottom of the winding portion 235, which is beneficial to preventing the winding from separating from the winding portion 235 from the sides where the third blocking portion 233 and the fourth blocking portion 234 are located during the winding of the winding.

Figure 2:
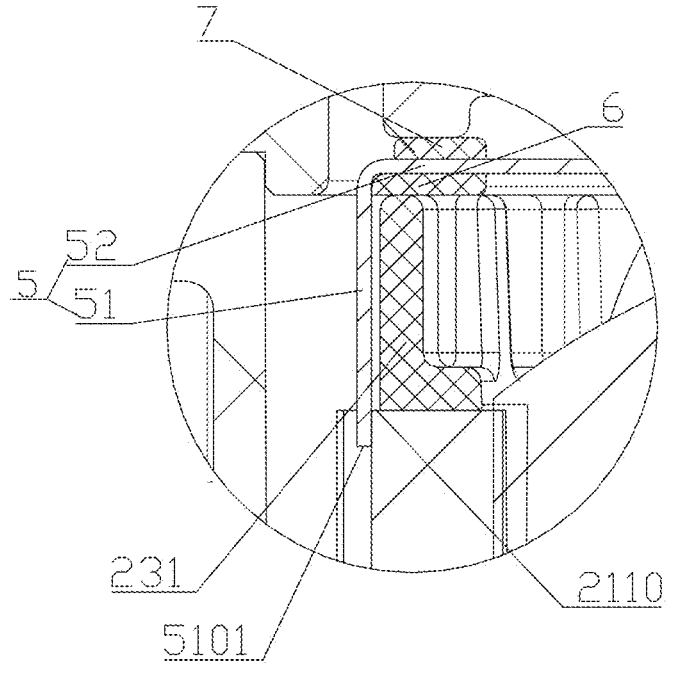
FIG. 2 is a schematic enlarged view of portion A in FIG. 1.

Referring to FIG. 1 and FIG. 2, FIG. 1 and FIG. 2 are schematic structural views of a first embodiment of the electric pump provided according to the present application. The first embodiment of the electric pump is described in detail below.

Referring to FIGS. 1 to 7, the electric pump 100 further includes a shield member 5, and the shield member 5 is made of a conductive metal. In this embodiment, the shield member 5 is annular, and at least part of the shield member 5 is located on an outer circumference of the first section 222 of the winding 22. With the above configuration, the shield member 5 located on the outer circumference of the first section 222 can absorb and reflect the electromagnetic waves generated by the first section 222 during the use of the electric pump, which is beneficial to reducing the electromagnetic waves radiated to the external environment from the first section 222 of the winding, and is therefore beneficial to reducing the interference of the electric pump on the external environment. The above shield member is described in detail below.

Figure 13:
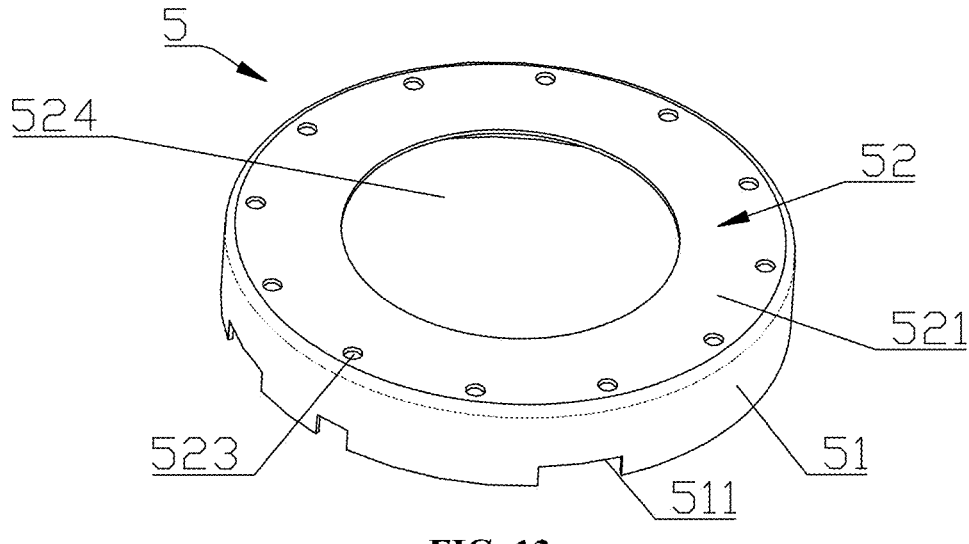
FIG. 13 is a schematic perspective view of the shield member in FIG. 8 or FIG. 9 viewed from one perspective.
Figure 14:
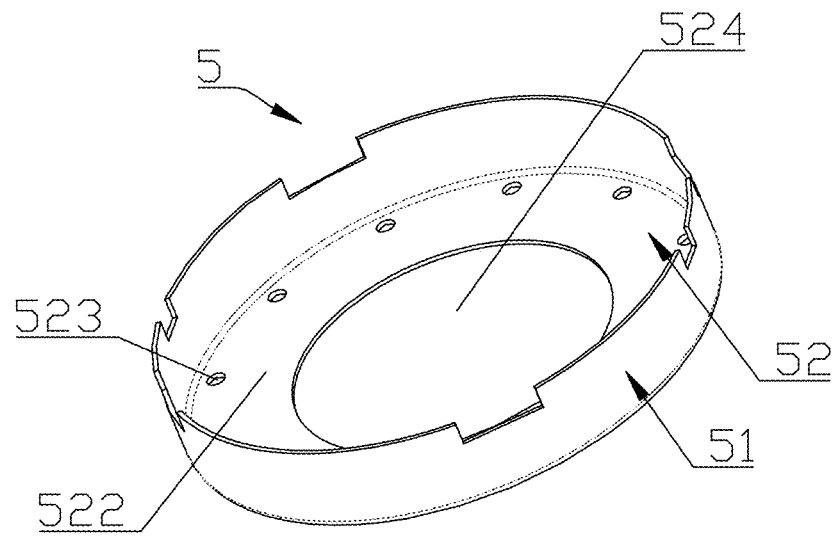
FIG. 14 is a schematic perspective view of the shield member in FIG. 8 or FIG. 9 viewed from another perspective.

Referring to FIG. 13 and FIG. 14, in this embodiment, the shield member 5 includes a cylinder portion 51 and a cover portion 52, where the cylinder portion 51 is connected to the cover portion 52. In this embodiment, the cylinder portion 51 and the cover portion 52 are of an integral structure. Alternatively, the cylinder portion 51 and the cover portion 52 may have split structures, that is, the cylinder portion 51 and the cover portion 52 are processed separately, and then connected together by welding, detachable connection or limit connection. Referring to FIGS. 1 to 14, in this embodiment, the cylinder portion 51 is arranged around the outer circumference of the first section 222. Specifically, the cylinder portion 51 is arranged around an outer circumference of the first blocking portion 231. Alternatively, the cylinder portion 51 may be embedded in the first blocking portion 231. Through the above configuration, the cylinder portion 51 can absorb and reflect the electromagnetic waves radiated toward the cylinder portion 51, which is beneficial to reducing the electromagnetic waves radiated to the external environment from the cylinder portion 51 and is therefore beneficial to reducing the interference of the electric pump on the external environment. Specifically, referring to FIGS. 1 to 7, in this embodiment, a height of the cylinder portion 51 is larger than a height of the first blocking portion 231, a bottom surface 5101 of the cylinder portion 51 is lower than an upper end surface 2110 of the stator iron core, and the first blocking portion 231 and the first section 222 of the winding are located inside the cylinder portion 51, so that the cylinder portion 51 can surround the first blocking portion 231 and the first section 222 of the winding along an axial direction of the insulating frame 23, which enables the cylinder portion 51 to absorb and reflect more electromagnetic waves radiated toward the cylinder portion 51 from the winding located on an inner circumference of the first blocking portion 231.

Referring to FIGS. 1 to 6, in this embodiment, the cover portion 52 covers the top 2221 of the first section 222 of the winding 22 and an end surface 2311 of the first blocking portion 231, so that the cover portion 52 can absorb and reflect the electromagnetic waves radiated toward the cover portion 52 from the winding 22, which is beneficial to reducing the electromagnetic waves generated by the winding 22 and radiated upward, is further beneficial to reducing the electromagnetic waves radiated to the external environment from the winding 22, and is therefore beneficial to reducing the interference of the electric pump on the external environment.

Referring to FIG. 13 and FIG. 14, the cover portion 52 includes a first surface 521 and a second surface 522, where the second surface 522 is closer to the winding 22 than the first surface 521, and the first surface 521 is parallel to the second surface 522, where the "parallel" herein refers to theoretical parallelism, while there may be processing and/or assembly errors during the actual processing and/or assembly, and all parallelism errors caused by processing and/or assembly are within the protection scope of the present application. Referring to FIGS. 1 to 3, FIG. 13 and FIG. 14, the electric pump 100 further includes a first elastic pad 6, where the first elastic pad 6 is located between the second surface 522 and the end surface of the first blocking portion 231, a lower end of the first elastic pad 6 abuts against the end surface of the first blocking portion 231, and an upper end of the first elastic pad 6 abuts against the second surface 522, where the "abut" herein may be direct abutment or indirect abutment. In this embodiment, it is direct abutment. Alternatively, a third party may be provided between the two, and indirect abutment is realized through the third party. The first elastic pad 6 is pressed along an axial direction of the electric pump by a positive pressure acting on the first elastic pad 6 through the cover portion 52 of the shield member 5, so that the elasticity of the first elastic pad 6 is beneficial to buffering the vibration generated between the stator assembly 2 and the shield member 5 when the electric pump vibrates, and is beneficial to reducing the noise caused by vibration. In addition, in this embodiment, the second surface 522 abuts against the upper end of the first elastic pad 6, and the first blocking portion 231 abuts against the first elastic pad 6. Alternatively, at least one of the second surface 522 and the first blocking portion 231 may abut against the end surface of the first elastic pad 6.

Referring to FIGS. 1 to 3, the electric pump 100 further includes a second elastic pad 7, where a lower end of the second elastic pad 7 abuts against the first surface 521, an upper end of the second elastic pad 7 closely abuts against the isolation portion 4, and the second elastic pad 7 is pressed along the axial direction of the electric pump by a positive pressure acting on the second elastic pad 7 through the isolation portion 4, which on the one hand, is beneficial to preventing the shield member 5 from moving along the axial direction of the electric pump, and on the other hand, is beneficial to buffering the vibration generated between the shield member 5 and the isolation portion 4 by virtue of the elasticity of the second elastic pad 7 when the electric pump vibrates, and is beneficial to reducing the noise caused by vibration. In addition, the above "abut" may be direct abutment or indirect abutment. In this embodiment, it is direct abutment. Alternatively, a third party may be provided between the two, and indirect abutment is realized through the third party.

Referring to FIG. 13 and FIG. 14, the cover portion 52 includes multiple first through holes 523, where the multiple first through holes 523 extend through the cover portion 52 along an axial direction of the cover portion, and the multiple first through holes 523 are uniformly distributed along a circumferential direction of the cover portion 52. In this embodiment, the first elastic pad 6 and the second elastic pad 7 are formed by injection molding with at least the shield member 5 as an insert, the first elastic pad 6 and the second elastic pad 7 are connected by connecting portions 9, and the connecting portions 9 are located in the first through holes 523. In this embodiment, all the connecting portions 9 are located in the first through holes 523. Alternatively, part of the connecting portions 9 are located in the first through holes 523. On one hand, the above arrangement is beneficial to the axial limiting and the radial limiting of the first elastic pad 6 and the second elastic pad 7, and on the other hand, the above limiting method for the first elastic pad 6 and the second elastic pad 7 has a simple structure and therefore has a low cost.

Referring to FIG. 13 and FIG. 14, the cover portion 52 further includes a second through hole 524, where the second through hole 524 extends through an upper surface and a lower surface of the cover portion 52 along the axial direction of the cover portion 52. Referring to FIG. 3, part of the third blocking portion 233 is located in the second through hole 524, which is beneficial to preventing the cover portion 52 from interfering with the third blocking portion 233 in structure. Alternatively, the cover portion 52 may cover the third blocking portion 233, and a radial size of the second through hole 524 may be correspondingly reduced in this case, as along as the radial size of the second through hole 524 does not interfere with the isolation portion 4 in FIG. 1 in structure.

Referring to FIG. 4 and FIG. 5, the iron core yoke portion 213 includes a body portion 2131 and a protruding portion 2132, where the protruding portion 2131 protrudes from an outer circumferential surface of the body portion 2131 along a radial direction of the stator iron core 21. Referring to FIG. 1, in this embodiment, the protruding portion 2132 is tightly fitted with an inner wall of a first housing 8, which on one hand, is beneficial to reducing an abutment area between the stator iron core 21 and the first housing 8 by providing the protruding portion 2132 and is beneficial to the assembly of the stator assembly, and on other hand, is beneficial to preventing the stator assembly from rotating circumferentially by providing a recessed portion, corresponding to the protruding portion 2132, on a side wall of an inner circumference of the first housing 8. Referring to FIG. 3, FIG. 5, FIG. 13 and FIG. 14, the cylinder portion 51 includes a notch portion 511, where the notch portion 511 extends through the shield member along a radial direction of the shield member 5. Along an axial direction of the shield member 5, a notch of the notch portion 511 faces the stator iron core 21, a width of the notch portion 511 is larger than a width of the protruding portion 2132, part of the protruding portion 2132 is located in the notch of the notch portion 511, and a gap is defined between a side surface of the notch portion 511 and a side surface of the protruding portion 2132. The provision of the notch portion 511 is beneficial to preventing the structural interference between the cylinder portion 51 and the protruding portion 2132 of the stator iron core 21. In addition, in this embodiment, only part of the protruding portion 2132 is located in the notch of the notch portion 511. Alternatively, a height of the notch portion 511 is extended by extending a height of the cylinder portion 51, so that the whole protruding portion 2132 is located in the notch of the notch portion 511.

In addition, referring to FIG. 1, in this embodiment, the isolation portion 4 is made of plastic. Alternatively, the isolation portion 4 may be made of metal, and the metal isolation portion can also absorb and reflect the electromagnetic waves radiated by the winding, which is beneficial to further reducing the electromagnetic waves radiated to the external environment from the winding, and is therefore beneficial to reducing the interference of the electric pump on the external environment.

Figure 15:
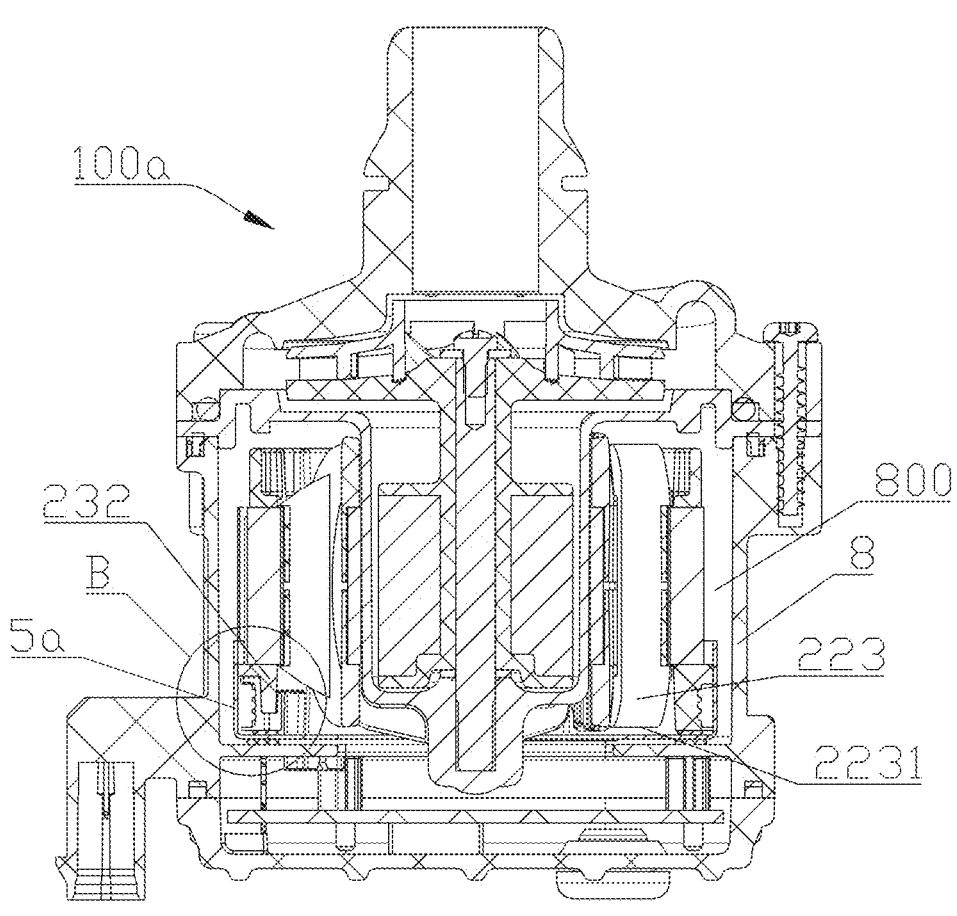
FIG. 15 is a schematic cross-sectional view of a second embodiment of the electric pump provided according to the present application.
Figure 16:
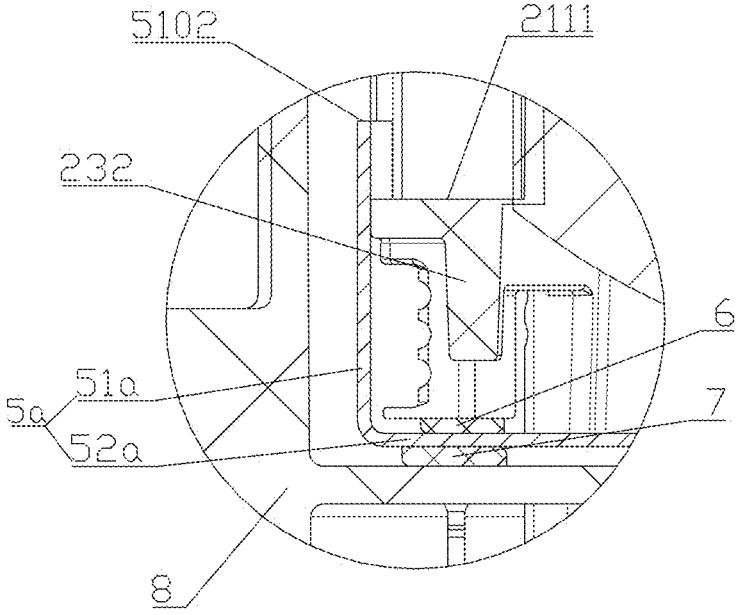
FIG. 16 is a schematic enlarged view of portion B in FIG. 15.

Referring to FIG. 15 and FIG. 16, FIG. 15 and FIG. 16 are schematic structural views of a second embodiment of the electric pump provided according to the present application. The second embodiment of the electric pump is described in detail below.

Figure 17:
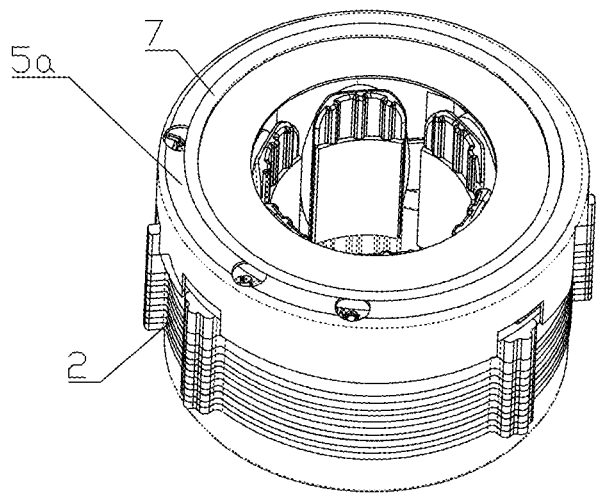
FIG. 17 is a schematic perspective view of an assembly of the stator assembly, the shield member, the first elastic pad and the second elastic pad in FIG. 15.
Figure 18:
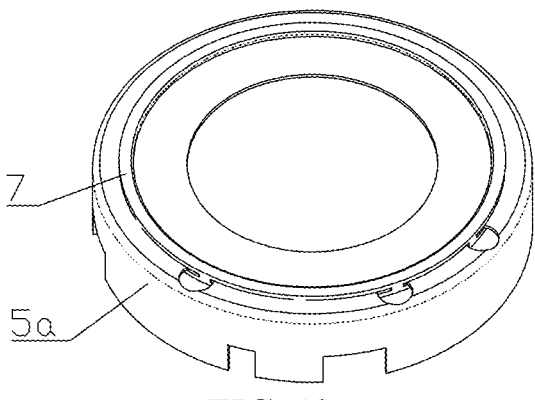
FIG. 18 is a schematic perspective view of an assembly of the shield member, the first elastic pad and the second elastic pad in FIG. 15 viewed from one perspective.
Figure 19:
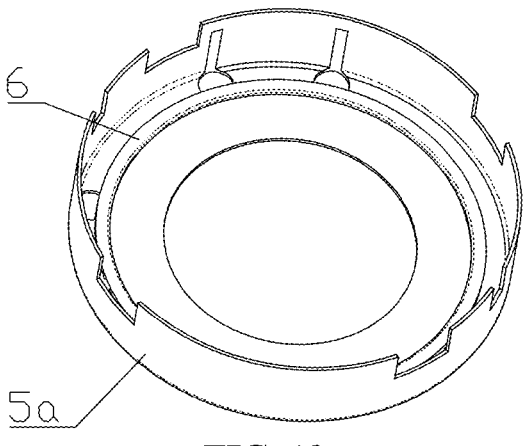
FIG. 19 is a schematic perspective view of an assembly of the shield member, the first elastic pad and the second elastic pad in FIG. 15 viewed from another perspective.

Referring to FIGS. 15 to 17, in this embodiment, at least part of the shield member 5 is located on an outer circumference of the second section 223 of the winding 22. With the above configuration, the shield member 5a located on the outer circumference of the second section 223 of the winding 2 can absorb and reflect the electromagnetic waves generated by the winding during the use of the electric pump 100a, which is beneficial to reducing the electromagnetic waves radiated to the external environment, and is therefore beneficial to reducing the interference of the electric pump on the external environment. Specifically, referring to FIGS. 15 to 20, in this embodiment, the shield member 5a includes a cylinder portion 51a and a cover portion 52a, where the cylinder portion 51a is connected to the cover portion 52a, and the cylinder portion 51a is arranged around the outer circumference of the second blocking section 232. Alternatively, the cylinder portion 51a may be embedded in the second blocking portion 232. Through the above configuration, the cylinder portion 51a can absorb and reflect the electromagnetic waves radiated toward the cylinder portion 51a, which is beneficial to reducing the electromagnetic waves radiated to the external environment and is therefore beneficial to reducing the interference of the electric pump on the external environment. Specifically, referring to FIGS. 15 to 16, in this embodiment, a height of the cylinder portion 51a is larger than the height of the second blocking portion 232, a top surface 5102 of the cylinder portion 51a is higher than a lower end surface 2111 of the stator iron core, and the second blocking portion 232 and the second section 223 of the winding are located inside the cylinder portion 51a, so that the cylinder portion 51a can surround the second blocking portion 232 and the second section 223 of the winding along the axial direction of the insulating frame 23, which enables the cylinder portion 51a to absorb and reflect more electromagnetic waves radiated toward the cylinder portion 51a from the winding located on an inner circumference of the second blocking portion 232.

Referring to FIGS. 15 to 17, the cover portion 52a covers the bottom 2231 of the second section 223 of the winding 22 and an end surface of the second blocking portion 232, so that the cover portion 52a can absorb and reflect the electromagnetic waves radiated toward the cover portion 52a, which is beneficial to reducing the electromagnetic waves generated by the winding and radiated downward, and is therefore beneficial to reducing the interference of the electric pump on the external environment.

Figure 20:
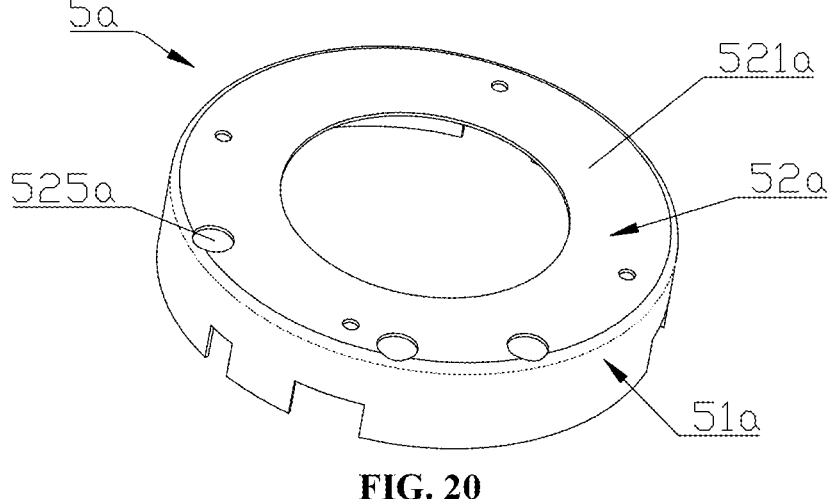
FIG. 20 is a schematic perspective view of the shield member in FIG. 18 or FIG. 19 viewed from one perspective.
Figure 21:
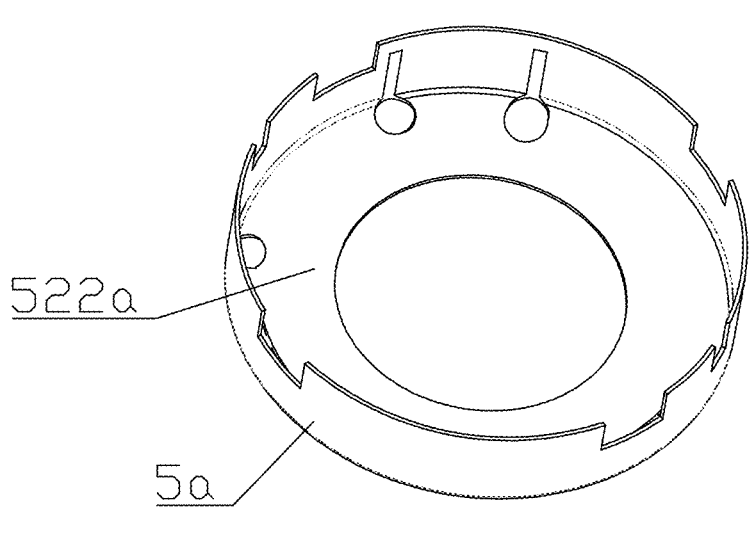
FIG. 21 is a schematic perspective view of the shield member in FIG. 18 or FIG. 19 viewed from another perspective.

Referring to FIG. 20 and FIG. 21, the cover portion 52a includes a first surface 521a and a second surface 522a, where the second surface 522a is closer to the winding 22 than the first surface 521a, and the first surface 521a is parallel to the second surface 522a, where the "parallel" herein refers to theoretical parallelism, while there may be processing and/or assembly errors during the actual processing and/or assembly, and all parallelism errors caused by processing and/or assembly are within the protection scope of the present application. Referring to FIG. 20 and FIG. 21, in this embodiment, the cover portion 52a further includes third through holes 525a, where the third through holes 525a extend through the shield member along an axial direction of the shield member 5a, and the provision of the third through holes 525a enables the enameled wire in the winding to pass out through the third through holes 52, so that the winding 22 can be electrically connected to an electric control board assembly.

Referring to FIGS. 15 to 19, the electric pump 100a further includes a first elastic pad 6, where the first elastic pad 6 is located between the second surface 522a and the end surface of the second blocking portion 232; an upper end of the first elastic pad 6 abuts against the end surface of the second blocking portion 232, a lower end of the first elastic pad 6 abuts against the second surface 522a, and the first elastic pad 6 is pressed along the axial direction of the electric pump by a positive pressure acting on the first elastic pad 6 through the cover portion 52a of the shield member 5a, so that the elasticity of the first elastic pad 6 is beneficial to buffering the vibration generated between the stator assembly and the shield member 5a when the electric pump vibrates, and is beneficial to reducing the noise caused by vibration.

Referring to FIG. 15, the electric pump 100a further includes a first housing 8, where the first housing 8 includes an accommodating portion 800, at least part of the stator assembly 2 is located in a chamber of the accommodating portion 800, and the chamber of the accommodating portion 800 is the second chamber. Alternatively, the chamber of the accommodating portion 800 may be a part of the second chamber. Referring to FIGS. 15 to 20, the electric pump 100a further includes a second elastic pad 7, where an upper end of the second elastic pad 7 abuts against the first surface 521a, a lower end of the second elastic pad 7 closely abuts against the first housing 8, and the second elastic pad 7 is pressed along the axial direction of the electric pump by a positive pressure acting on the second elastic pad 7 through the first housing 8, so that the elasticity of the second elastic pad 7 is beneficial to buffering the vibration generated between the shield member 5a and the first housing 8 when the electric pump vibrates, and is beneficial to reducing the noise caused by vibration.

Compared with the first embodiment of the electric pump, in this embodiment, the cylinder portion 51a of the shield member 5a is arranged on the outer circumference of the second section 223 of the winding 22. Specifically, the cylinder portion 51a of the shield member 5a is arranged on the outer circumference of the second blocking portion 232, so that the cylinder portion 51a of the shield member 5a can absorb and reflect the electromagnetic waves radiated toward the cylinder portion 51a from the second section of the winding. In this embodiment, other structural features of the shield member 5a can make reference to the structural features of the shield member 5a in the first embodiment of the electric pump, which are not repeated herein.

Figure 22:
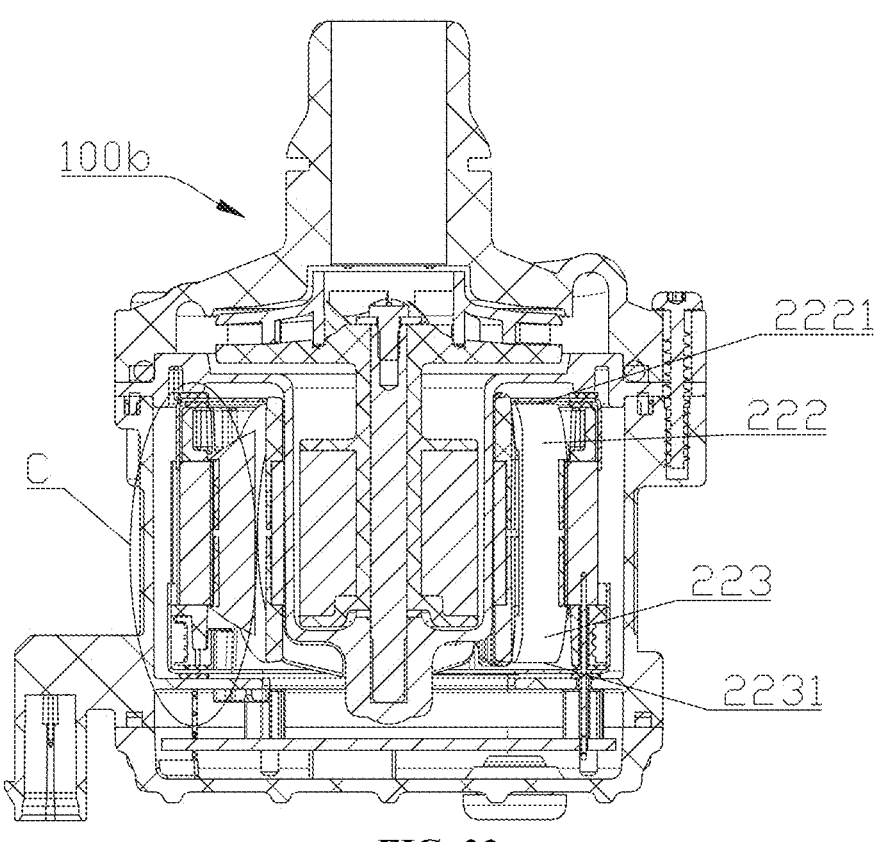
FIG. 22 is a schematic cross-sectional view of a third embodiment of the electric pump provided according to the present application.
Figure 23:
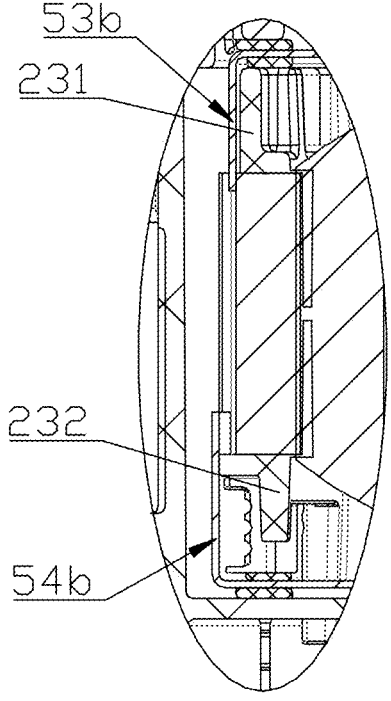
FIG. 23 is a schematic enlarged view of portion C in FIG. 22.

Referring to FIG. 22 and FIG. 23, FIG. 22 and FIG. 23 are schematic structural views of a third embodiment of the electric pump provided according to the present application. The third embodiment of the electric pump is described in detail below.

Figures 24, 25:
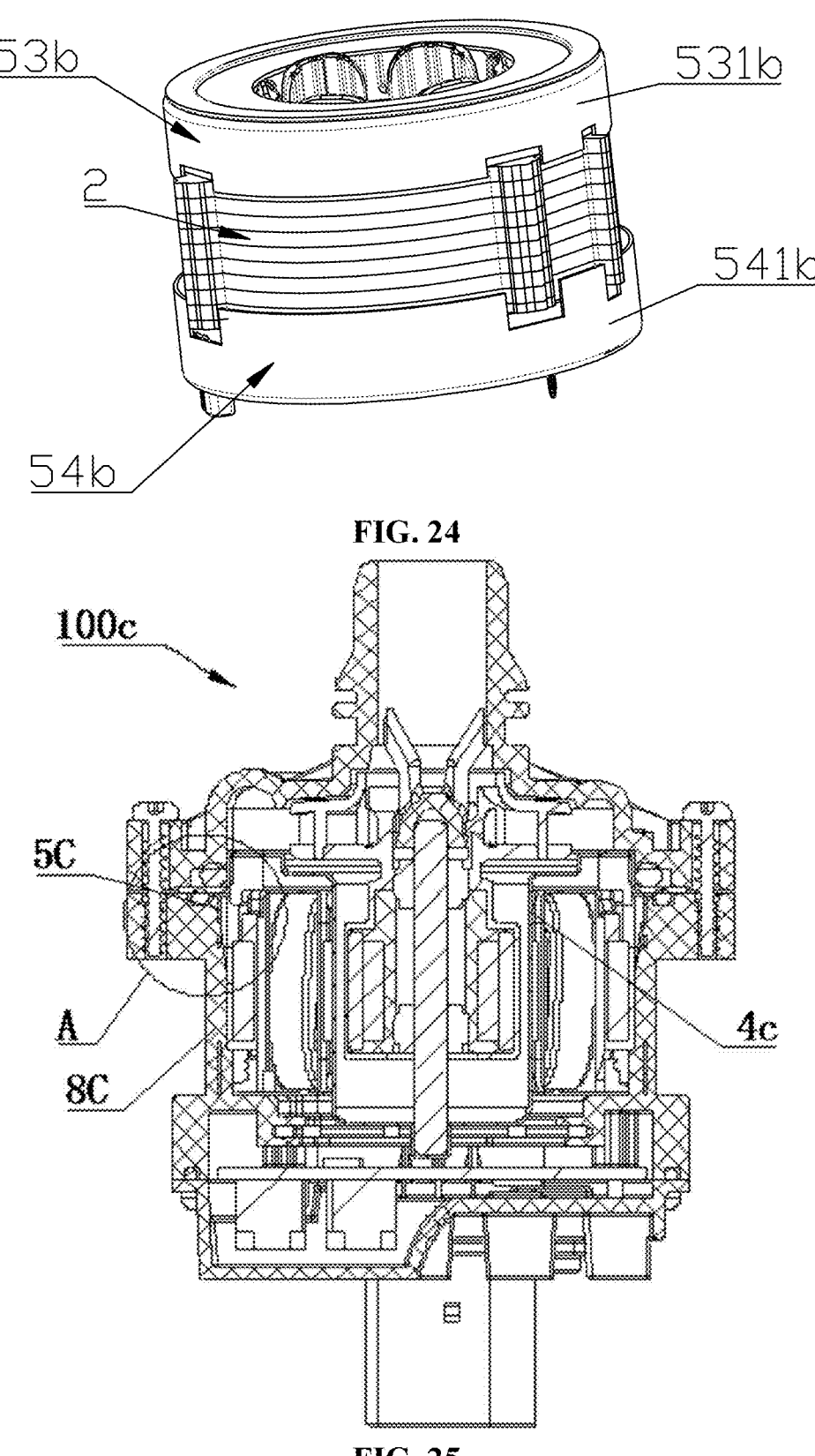
FIG. 24 is a schematic perspective view of an assembly of a first shield member, a second shield member, and the stator assembly in FIG. 22.
FIG. 25 is a schematic cross-sectional view of a fourth embodiment of the electric pump provided according to the present application.

Referring to FIGS. 22 to 24, in this embodiment, the electric pump 100b includes two shield members, one of which is defined as a first shield member 53b, the other of which is defined as a second shield member 54b. At least part of the first shield member 53b is located on the outer circumference of the first section 222 of the winding, and at least part of the second shield member 54b is located on the outer circumference of the second section 223 of the winding. At least part of the first shield member 53b is arranged on an outer circumference of the first blocking portion 231, and at least part of the second shield member 54b is arranged on an outer circumference of the second blocking portion 232, so that during the use of the electric pump, the first shield member 53b can absorb and reflect the electromagnetic waves generated by the first section 222 of the winding, and the second shield member 54b can absorb and reflect the electromagnetic waves generated by the second section 223 of the winding, which is beneficial to reducing the electromagnetic waves radiated to the external environment, and is therefore beneficial to reducing the interference of the electric pump on the external environment. Referring to FIG. 24, the cylinder portion of the first shield member 53b is defined as a first cylinder portion 531b, and the cover portion of the first shield member 53b is defined as a first cover portion 532b, where the first cylinder portion 531b is arranged around the outer circumference of the first section 222 of the winding, and the first cover portion 532b covers at least the top 2221 of the first section 222 of the winding, so that the first cover portion 532b can absorb and reflect the electromagnetic waves radiated toward the first cover portion 532b, which is beneficial to reducing the electromagnetic waves generated by the winding and radiated upward, is further beneficial to reducing the electromagnetic waves radiated to the external environment, and is therefore beneficial to reducing the interference of the electric pump on the external environment. The cylinder portion of the second shield member 54b is defined as a second cylinder portion 541$b$, and the cover portion of the second shield member 54$b$ is defined as a second cover portion 542$b$, where the second cylinder portion 541$b$ is arranged around the outer circumference of the second section 223 of the winding, and the second cover portion 542$b$ covers at least the bottom 2231 of the second section 223 of the winding, so that the second cover portion 542$b$ can absorb and reflect the electromagnetic waves radiated toward the second cover portion 542$b$, which is beneficial to reducing the electromagnetic waves generated by the winding and radiated downward, is further beneficial to reducing the electromagnetic waves radiated to the external environment, and is therefore beneficial to reducing the interference of the electric pump on the external environment.

Compared with the first embodiment of the electric pump, in this embodiment, the electric pump includes two shield members, the cylinder portion of one shield member is arranged on the outer circumference of the first section 222 of the winding, and the cylinder portion of the other shield member is arranged on the outer circumference of the second section 223 of the winding. Specifically, the cylinder portion of one shield member is arranged on the outer circumference of the first blocking portion 231, and the cylinder portion of the other shield member is arranged on the outer circumference of the second blocking portion 232, so that the electromagnetic waves radiated toward the first blocking portion 231 and the second blocking portion 232 from the winding can be absorbed and reflected by the cylinder portions. In addition, in this embodiment, other structural features of the first shield member 53$b$ can make reference to the structural features of the shield member in the first embodiment of the electric pump, and other structural features of the second shield member 54$b$ can make reference to the structural features of the shield member in the second embodiment of the electric pump, which are not repeated herein.

Figure 26:
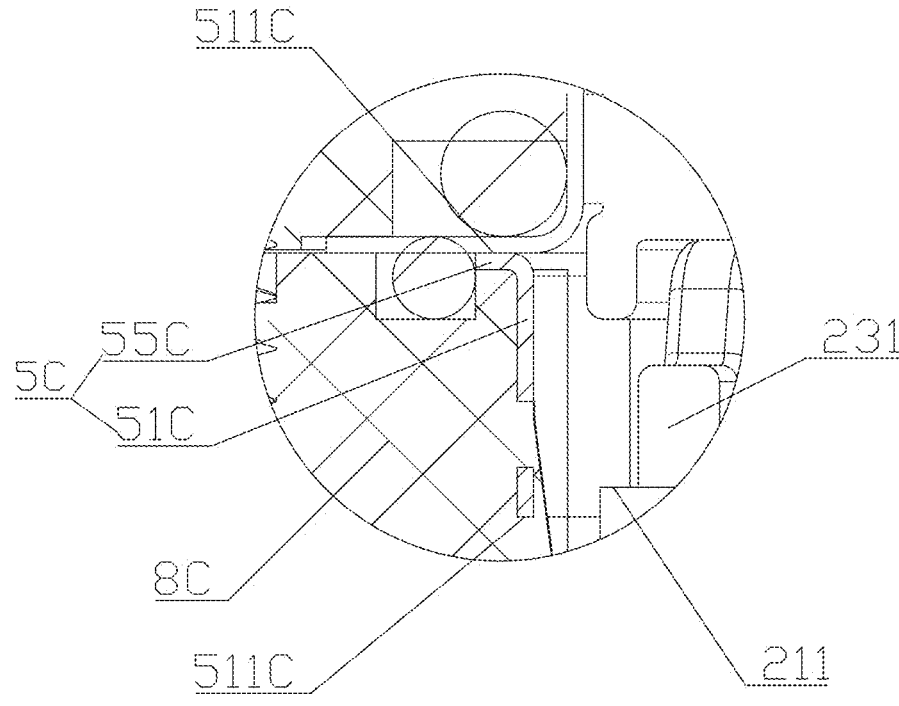
FIG. 26 is a schematic enlarged view of portion A in FIG. 25.
Figure 27:
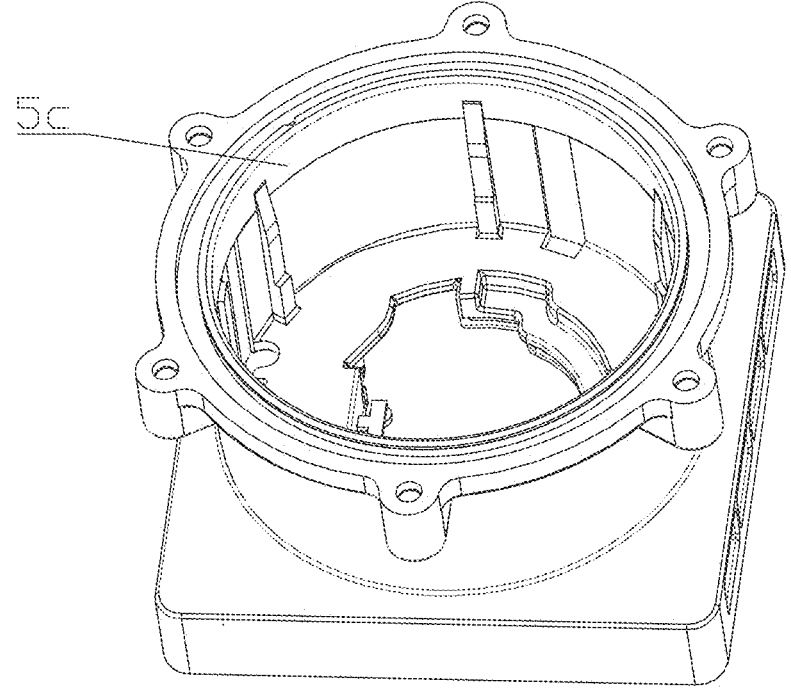
FIG. 27 is a schematic perspective view of an assembly of a first housing and the shield member in FIG. 25.

Referring to FIG. 25 and FIG. 26, FIG. 25 and FIG. 26 are schematic structural views of a fourth embodiment of the electric pump provided according to the present application. The fourth embodiment of the electric pump is described in detail below.

Referring to FIGS. 25 to 28, in this embodiment, a first housing 8$c$ is formed by injection molding with at least a shield member 5$c$ as an insert. The shield member 5$c$ includes a cylinder portion 51$c$ and a flange portion 55$c$, where the flange portion 55$c$ is connected to the cylinder portion 51$c$, an outer circumferential surface of the cylinder portion 51$c$ is closer to a center axis of the shield member 5$c$ than an outer circumferential surface of the flange portion 55$c$, and the cylinder portion 51$c$ is arranged around the outer circumference of the first section 222 of the winding 22. Specifically, in this embodiment, the cylinder portion 51$c$ is arranged around the outer circumference of the first blocking portion 231, an axial height of the cylinder portion 51$c$ is larger than an axial height of the first blocking portion 231, a bottom surface 511$c$ of the cylinder portion 51$c$ is lower than an upper end surface 211 of the stator iron core 21, and an end surface 551$c$ of the flange portion 55$c$ is flush with or higher than the top 2221 of the first section 222 of the winding, so that the cylinder portion 51$c$ can surround the second section 223 of the winding, and further the cylinder portion 51$c$ can absorb and reflect more electromagnetic waves radiated toward the cylinder portion 51$c$ from the winding located at the first section 221. Referring to FIGS. 25 to 28, part of an inner circumferential surface of the cylinder portion 51$c$ is exposed, so that the exposed inner circumferential surface of the cylinder portion 51$c$ can be used as a positioning reference plane of a mold during the injection molding.

Figure 28:
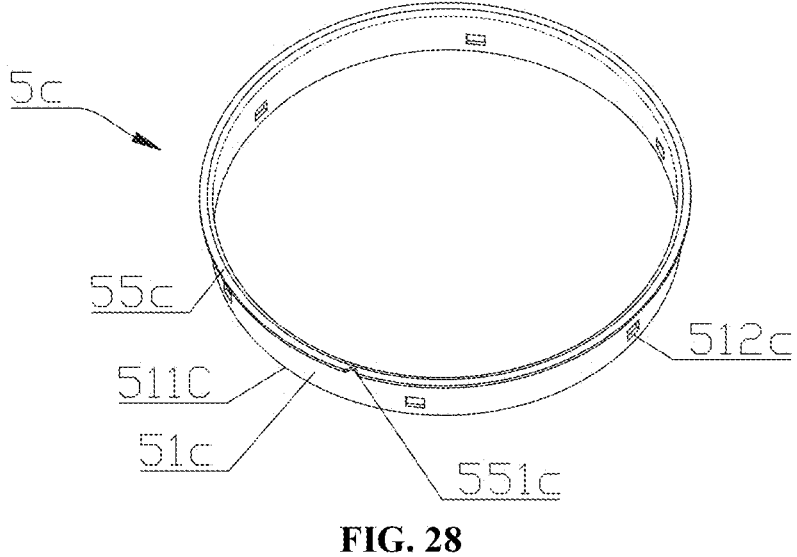
FIG. 28 is a schematic perspective view of the shield member in FIG. 26 or FIG. 27.
Figure 29:
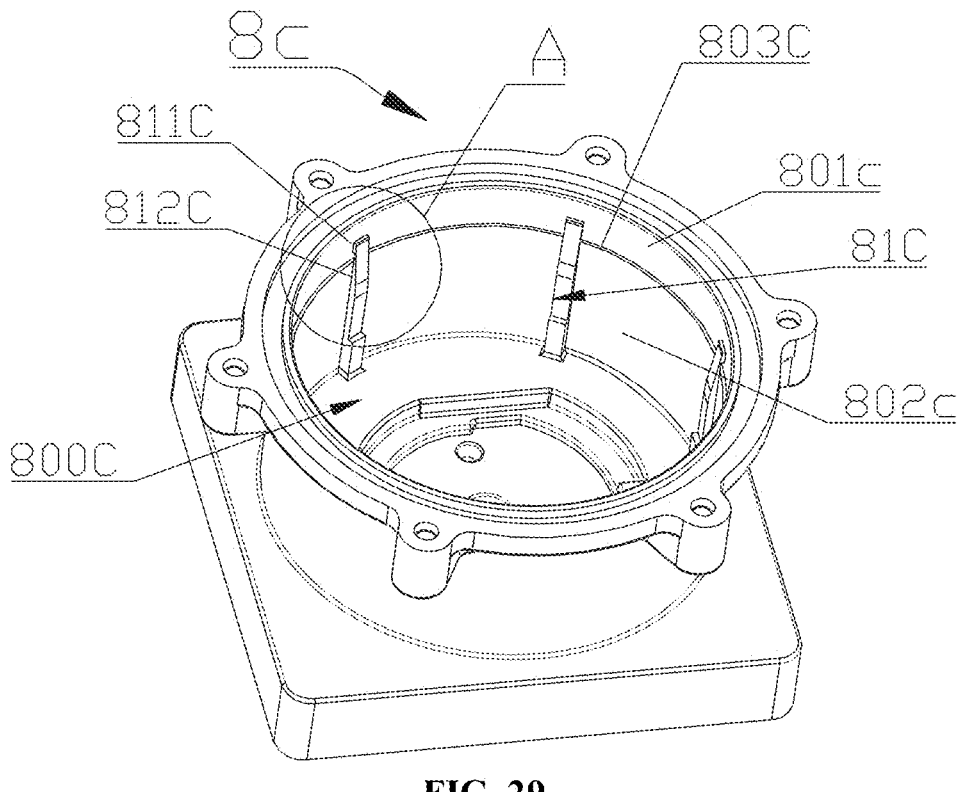
FIG. 29 is a schematic perspective view of the first housing in FIG. 26 or FIG. 27.
Figure 30A:
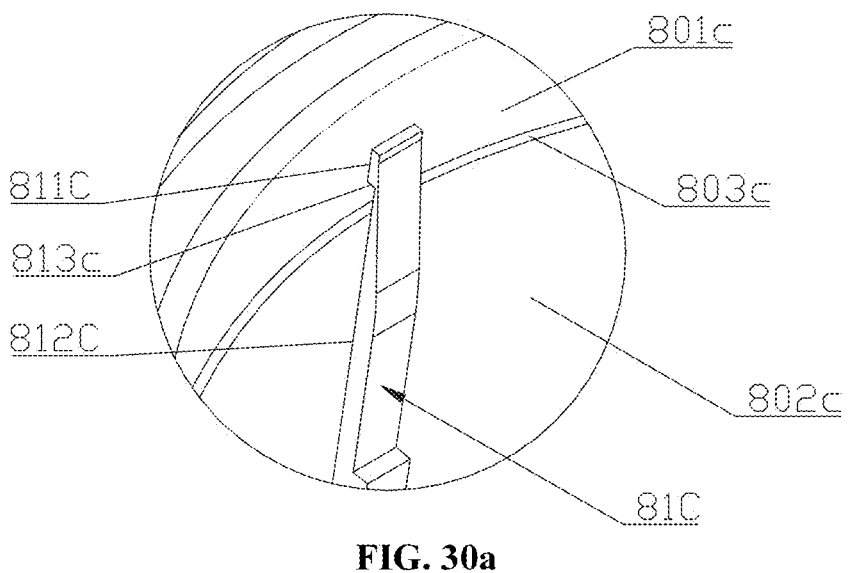
FIG. 30a is a schematic enlarged view of portion A in FIG. 29.
Figure 30B:
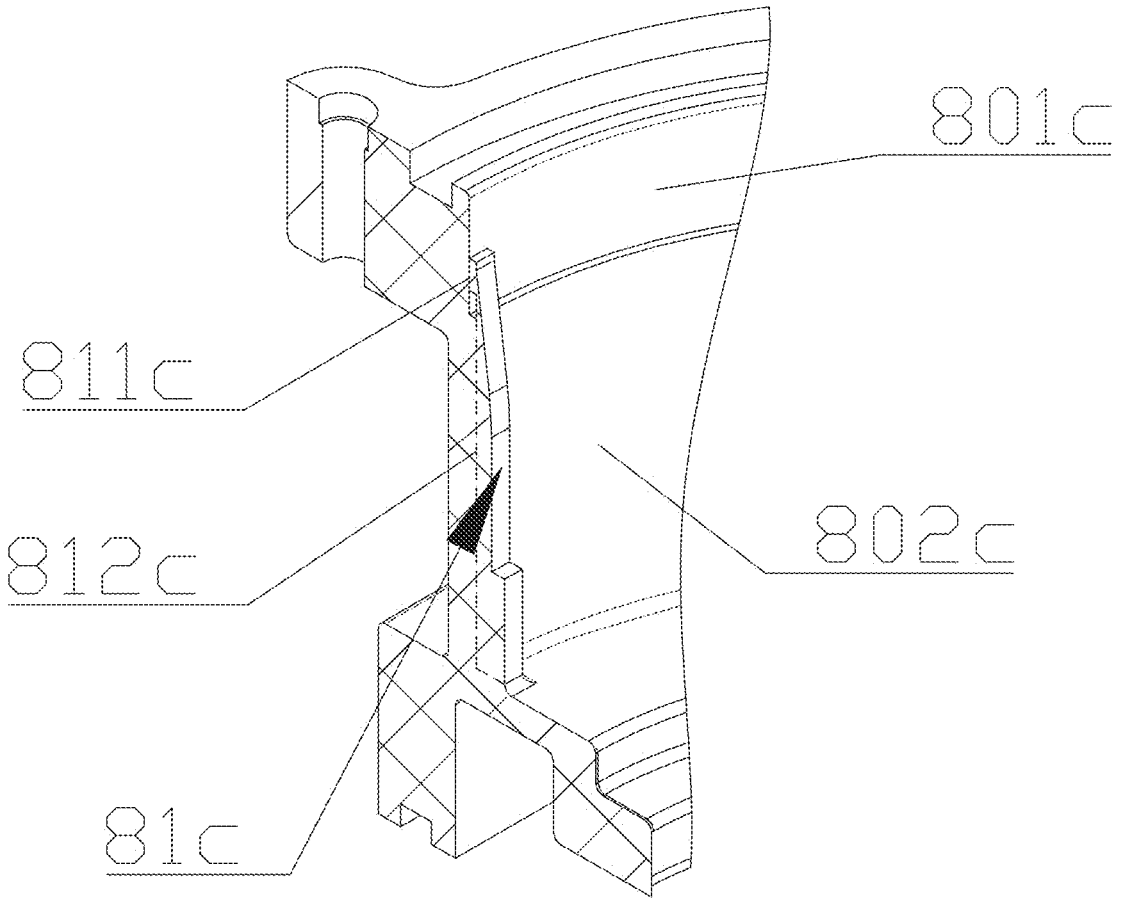
FIG. 30b is a schematic perspective cross-sectional view of part of the first housing in FIG. 29.

Referring to FIG. 28, the cylinder portion 51$c$ includes at least two hole portions 512$c$, where the at least two hole portions 512$c$ extend through the cylinder portion along a radial direction of the cylinder portion 51$c$. In this embodiment, the at least two hole portions 512$c$ are evenly distributed along a circumferential direction of the cylinder portion 51$c$. Referring to FIGS. 29 to 30$b$, in this embodiment, a side wall of the accommodating portion 800$c$ of the first housing 8$c$ includes a first side wall 801$c$ and a second side wall 802$c$, where a diameter of the first side wall 801$c$ is larger than a diameter of the second side wall 802$c$, the first side wall 801$c$ is located above the second side wall 802$c$, and the first side wall 801$c$ and the second side wall 802$c$ are connected by a stepped surface 803$c$. The first housing 8$c$ includes at least two protruding ribs 81$c$, where the at least two protruding ribs 81$c$ are evenly distributed along a circumferential direction of the first housing 8$c$, the at least two protruding ribs 81$c$ are located on an inner circumference of the first housing 8$c$, the at least two protruding ribs 81$c$ are arranged to protrude from part of an inner circumferential surface of the first housing 8$c$ toward a center axis of the first housing 8$c$ along a radial direction of the first housing 8$c$, and the at least two protruding ribs 81$c$ extend along an axial direction of the first housing 8$c$. Referring to FIGS. 29 to 30$b$, part of each protruding rib 81$c$ is connected to the side wall of the accommodating portion 800$c$ of the first housing 8$c$. Specifically, each protruding rib 81$c$ includes a first root portion 811$c$ and a second root portion 812$c$. For the convenience of description, referring to FIG. 30$b$, the first root portion 811$c$ and the second root portion 812$c$ are denoted with dotted lines, the first root portion 811$c$ is located on the first side wall 801$c$, part of the second root portion 812$c$ is located on the second side wall 802$c$, another part of the second root portion 812$c$ is in contact with an inner wall of the cylinder portion 51$c$, which can be understood with reference to FIG. 26, FIG. 29 and FIG. 30$b$. The first root portion 811$c$ and the second root portion 812$c$ are connected by a connecting portion 813$c$, the connecting portion 813$c$ is located above the stepped surface 803$c$, and a lower end surface of the cylinder portion 51$c$ of the shield member 5$c$ is in contact with the stepped surface 803$c$. In the cylinder portion 51$c$ of the shield member 5$c$, a portion between the lower end surface of the cylinder portion 51$c$ and the respective hole portion 512$c$ is limited between the stepped surface 803$c$ and the connecting portion 813, a portion, located above the hole portions 512$c$, of the cylinder portion 51$c$ is located above the protruding ribs 81$c$, and each first root portion 811$c$ is matched with each hole portion 512$c$ in shape. Specifically, in this embodiment, a portion, protruding from the first root portion 811$c$, of each protruding rib 81$c$ is located in the corresponding hole portion 512$c$, and a main cross section of the portion, protruding from the first root portion 811$c$, of each protruding rib 81$c$ is matched with a cross section of the corresponding hole portion 512$c$ in shape, where the above "matched in shape" means that the first root portion 811$c$ and the hole portion 512$c$ with the same cross sectional shape are arranged corresponding to each other. The above arrangement is beneficial to limiting the shield member 5$c$ in the axial direction and the circumferential direction. In addition, in this embodiment, positions of the first root portions 811$c$ are arranged in one-to-one correspondence with positions of the hole portions 512$c$.

Referring to FIG. 28, the flange portion 55c includes a recessed portion 551c, where the recessed portion 551c is recessed from the outer circumferential surface of the flange portion 55c toward the center axis of the shield member 5c along a radial direction of the shield member 5c, and the recessed portion 551c extends through the flange portion along an axial direction of the flange portion 55c. By defining the recessed portion 551c on the flange portion 55c, the recessed portion 551c can be used as an error-proof feature identification point when the shield member 5c is put into the mold for the injecting molding of the first housing 8c, so as to provide a reference for the placement direction of the shield member 5c, so that the positions of the first root portions 811c can be arranged in correspondence with the positions of the hole portions 512c during injection molding.

Referring to FIG. 25, in this embodiment, the isolation portion 4c is made of metal, and part of the isolation portion 4c is laid over the winding 22, so that the isolation portion 4c over the winding 22 can absorb and reflect the electromagnetic waves generated by the winding, which is beneficial to reducing the electromagnetic waves generated by the winding and radiated upward, is further beneficial to reducing the electromagnetic waves radiated to the external environment from the winding, and is therefore beneficial to reducing the interference of the electric pump on the external environment.

Compared with the first embodiment of the electric pump, in this embodiment, the first housing 8c is formed by injection molding with at least the shield member 5c as an insert; that is, the first housing 8c and the shield member 5c are fixedly connected by injection molding. As shown in FIG. 26, an injection molding material flows into the hole portion 512c to form the first root portion 811c, which has a simple structure and is easy to assemble.

Figures 31, 32:
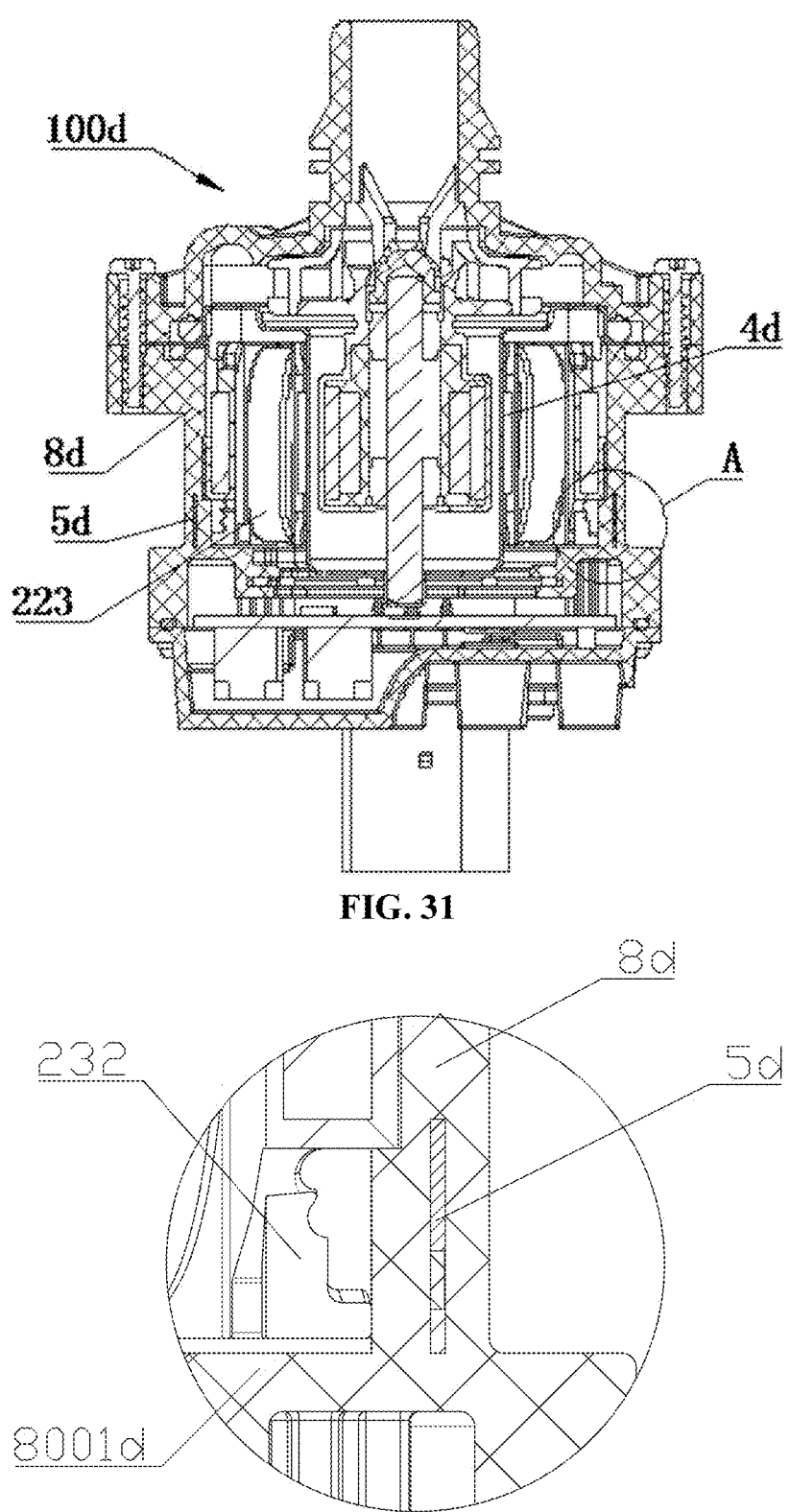
FIG. 31 is a schematic cross-sectional view of a fifth embodiment of the electric pump provided according to the present application.
FIG. 32 is a schematic enlarged view of portion A in FIG. 31.
Figure 33:
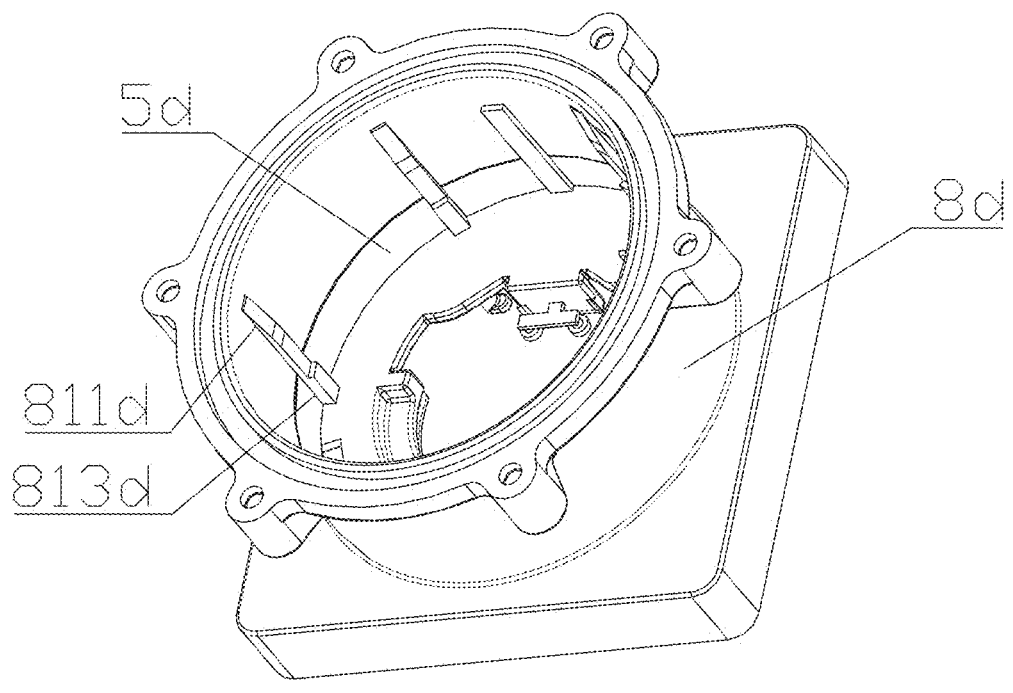
FIG. 33 is a schematic perspective view of an assembly of the first housing and the shield member in FIG. 31.
Figure 34:
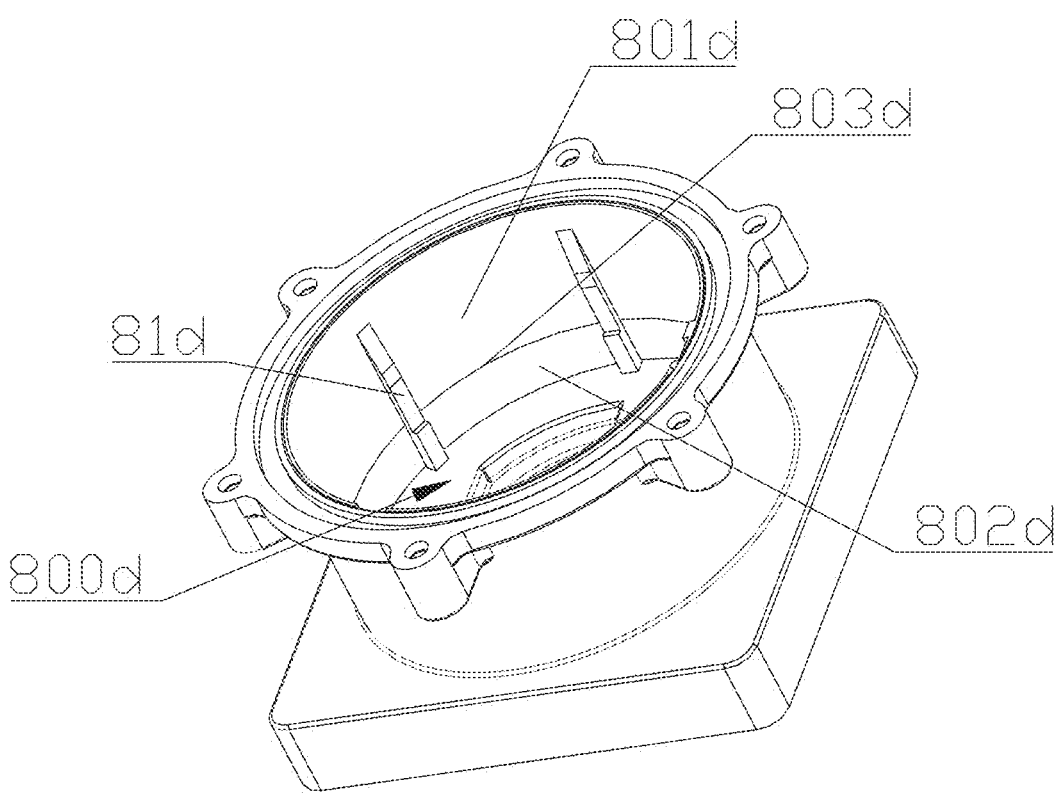
FIG. 34 is a schematic perspective view of the first housing in FIG. 31.
Figure 35:
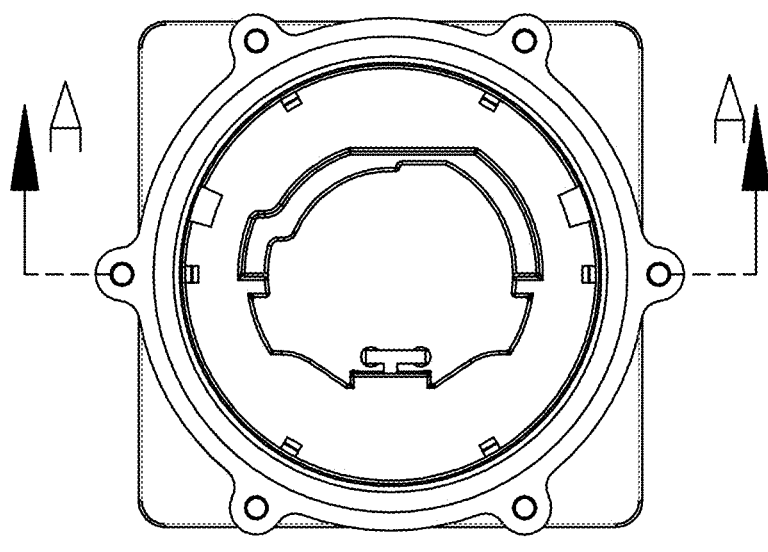
FIG. 35 is a schematic front view of the first housing in FIG. 34.
Figure 36:
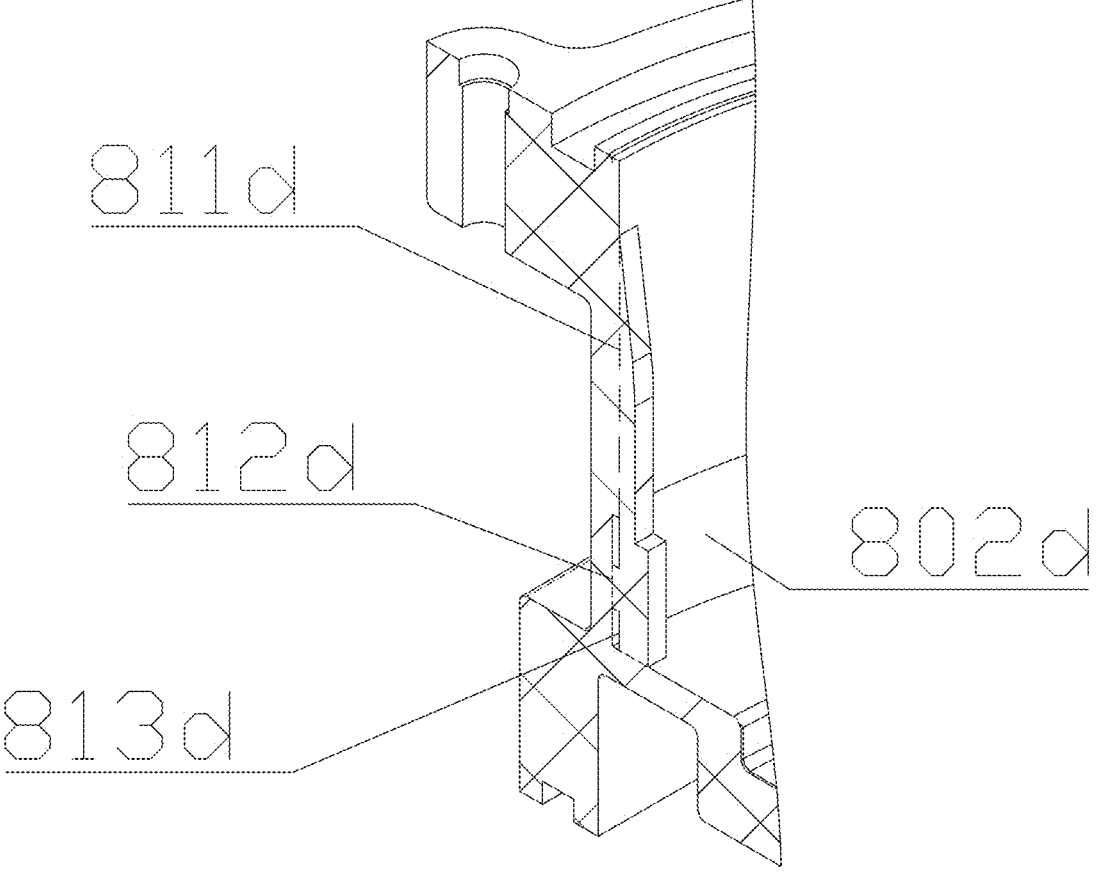
FIG. 36 is a schematic perspective cross-sectional view of the first housing in FIG. 35 taken along line A-A.

Referring to FIG. 31 and FIG. 32, FIG. 31 and FIG. 32 are schematic structural views of a fifth embodiment of the electric pump provided according to the present application. The fifth embodiment of the electric pump is described in detail below.

Referring to FIGS. 31 to 37, in this embodiment, a first housing 8d is formed by injection molding with at least a shield member 5d as an insert. The shield member 5d is cylindrical, the shield member 5d includes a cylinder portion 51d, and the cylinder portion 51d is arranged around the outer circumference of the second section 223 of the winding. Specifically, in this embodiment, the cylinder portion 51d is arranged around the outer circumference of the second blocking portion 232, an axial height of the cylinder portion 51d is larger than an axial height of the second blocking portion 232, and part of an inner circumferential surface of the cylinder portion 51d is exposed, so that the exposed inner circumferential surface of the cylinder portion 51d can be used as a positioning reference plane of the mold during the injection molding.

Figure 37:
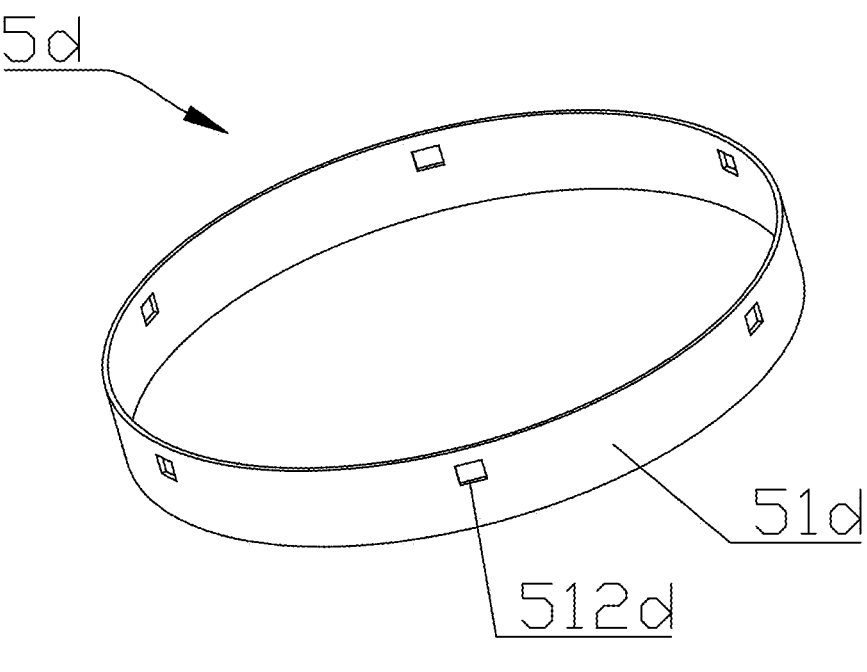
FIG. 37 is a schematic perspective view of the shield member in FIG. 31 or FIG. 33.
Figure 38:
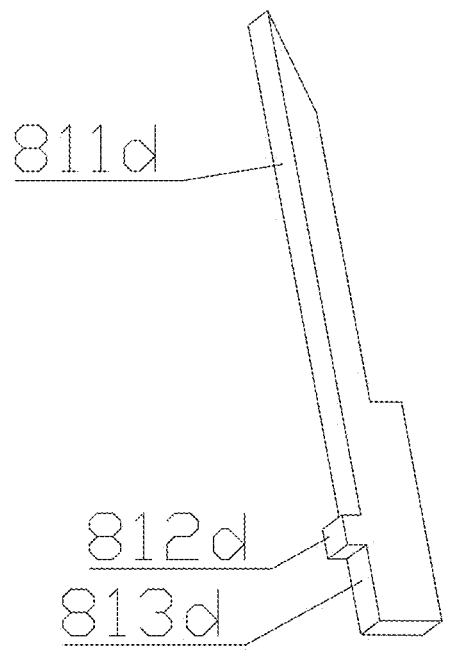
FIG. 38 is a schematic perspective view of a protruding rib in FIG. 34.

Referring to FIG. 37, the cylinder portion 51d includes at least two hole portions 512d, where the at least two hole portions 512d extend through the cylinder portion along a radial direction of the cylinder portion 51d. Referring to FIG. 34 to FIG. 38, the first housing 8d includes at least two protruding ribs 81d, where the at least two protruding ribs 81d are evenly distributed along a circumferential direction of the first housing 8d, the at least two protruding ribs 81d are located on an inner circumference of the first housing 8c, the at least two protruding ribs 81d are arranged to protrude from part of an inner circumferential surface of the first housing 8d toward a center axis of the first housing 8d along a radial direction of the first housing 8d, and the at least two protruding ribs 81d extend along an axial direction of the first housing 8d. In this embodiment, a side wall of the accommodating portion 800d of the first housing 8d includes a first side wall 801d and a second side wall 802d, where a diameter of the first side wall 801d is larger than a diameter of the second side wall 802d, the first side wall 801d is located above the second side wall 802d, and the first side wall 801d and the second side wall 802d are connected by a stepped surface 803d. Referring to FIGS. 31 to 37, an upper end surface of the cylinder portion 51d is in contact with the stepped surface 803d, a lower end surface of the cylinder portion 51d abuts against a bottom wall 8001d of the accommodating portion 800d of the first housing 8d, and the bottom 2231 of the second section 223 of the winding does not abut against the bottom wall 8001d of the accommodating portion 800d of the first housing 8d, so that the cylinder portion 51d can surround the second section 223 of the winding, and the cylinder portion 51d can absorb and reflect more electromagnetic waves radiated toward the cylinder portion 51d from the winding located at the first section 221.

Referring to FIGS. 33 to 38, part of each protruding rib 81d is connected to the side wall of the accommodating portion 800d of the first housing 8d. Specifically, each protruding rib 81d includes a first root portion 811d, a second root portion 812d and a third root portion 813d. For the convenience of description, referring to FIG. 37, the first root portion 811d, the second root portion 812d and the third root portion 813d are denoted with dotted lines. Referring to FIGS. 33 to 38, the first root portion 811d is located above the second root portion 812d, the third root portion 813d is located below the second root portion 812d, part of the first root portion 811d is located on the first side wall 801d, another part of the first root portion 811d is in contact with an inner wall of the cylinder portion 51d, the third root portion 813d is in contact with the inner wall of the cylinder portion 51d, the second root portion 812d is located on the second side wall 802d, and the second root portion 812d is matched with the corresponding hole portion 512d in shape. Specifically, in this embodiment, a portion, protruding from the second root portion 812d, of each protruding rib 81d is located in the corresponding hole portion 512d, and a main cross section of the portion, protruding from the second root portion 812d, of each protruding rib 81d is matched with a cross section of the corresponding hole portion 512d in shape, the "matched in shape" means that the second root portion 812d and the hole portion 512d with the same cross sectional shape are arranged corresponding to each other. Specifically, the injection molding material flows into the hole portion 512d to form the second root portion 812d when the shield member 5d is used as an insert to process the first housing 8d. The above arrangement is beneficial to limiting the shield member 5d in the axial direction and the circumferential direction.

Referring to FIG. 31, in this embodiment, the isolation portion 4d is made of metal, and part of the isolation portion 4d is laid over the winding, so that the isolation portion 4d over the winding can absorb and reflect the electromagnetic waves generated by the winding, which is beneficial to reducing the electromagnetic waves generated by the winding and radiated upward, is further beneficial to reducing the electromagnetic waves radiated to the external environment from the winding, and is therefore beneficial to reducing the interference of the electric pump on the external environment.

Compared with the fifth embodiment of the electric pump, in this embodiment, the first housing 8d is formed by injection molding with at least the shield member 5*d* as an insert, and the cylinder portion 51*d* is arranged around the outer circumference of the second section 223 of the winding.

Figure 39:
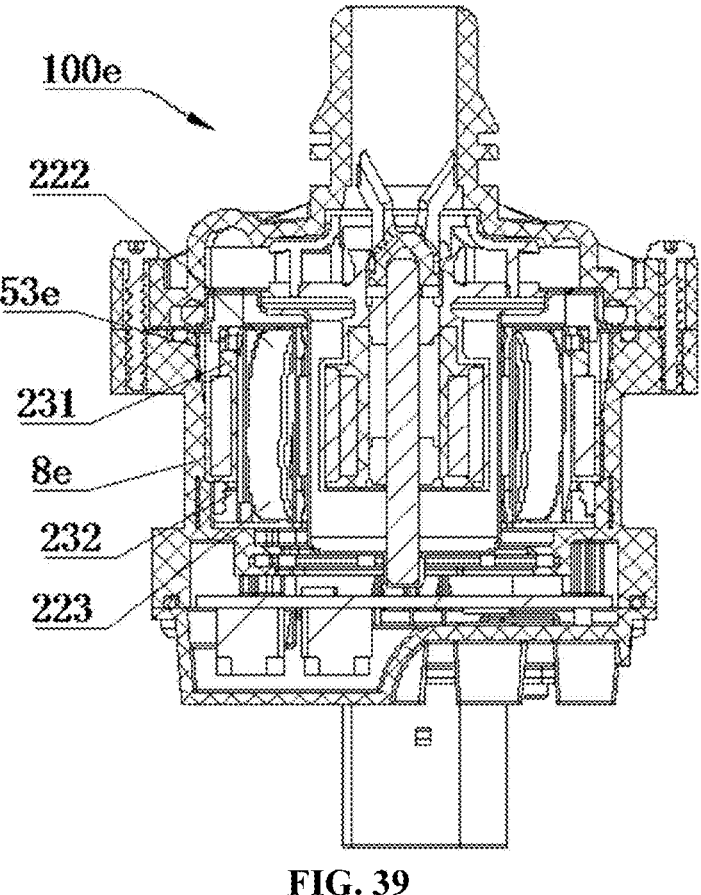
FIG. 39 is a schematic cross-sectional view of a sixth embodiment of the electric pump provided according to the present application.
Figure 40:
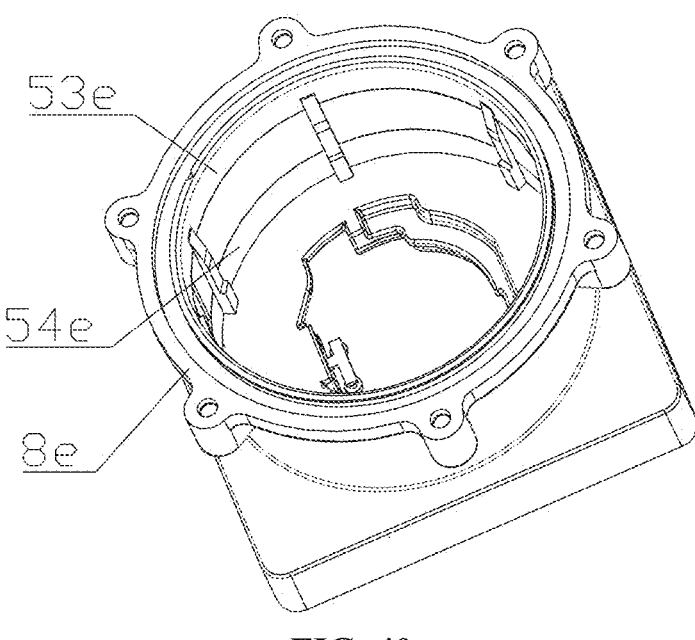
FIG. 40 is a schematic perspective view of an assembly of the first shield member, the second shield member, and the first housing in FIG. 39.

Referring to FIG. 39 and FIG. 40, FIG. 39 and FIG. 40 are schematic structural views of a sixth embodiment of the electric pump provided according to the present application. The sixth embodiment of the electric pump is described in detail below.

Referring to FIGS. 39 to 40, in this embodiment, the electric pump 100*e* includes two shield members, one of which is defined as a first shield member 53*e*, the other of which is defined as a second shield member 54*e*. At least part of the first shield member 53*e* is located on the outer circumference of the first section 222 of the winding, and at least part of the second shield member 54*e* is located on the outer circumference of the second section 232 of the winding. Specifically, at least part of the first shield member 53*e* is arranged on the outer circumference of the first blocking portion 231, and at least part of the second shield member 54*e* is arranged on the outer circumference of the second blocking portion 232, so that during the use of the electric pump, the first shield member 53*e* can absorb and reflect the electromagnetic waves generated by the first section 222 of the winding, and the second shield member 54*e* can absorb and reflect the electromagnetic waves generated by the second section 223 of the winding, which is beneficial to reducing the electromagnetic waves radiated to the external environment, and is therefore beneficial to reducing the interference of the electric pump on the external environment. In this embodiment, the first housing 8*e* is formed by injection molding with at least the first shield member 53*e* and the second shield member 54*e* as an insert.

In addition, in this embodiment, other structural features of the first shield member 53*e* can make reference to the structural features of the shield member in the fifth embodiment of the electric pump, and other structural features of the second shield member 54*e* can make reference to the structural features of the shield member in the fifth embodiment of the electric pump, which are not repeated herein.

It should be noted that, the above embodiments are only intended to illustrate the present application and not to limit the technical solutions described in the present application. Although the present specification has been described in detail with reference to the embodiments described above, it should be understood by those skilled in the art that, various modifications and equivalents can be made to the technical solutions of the present application without departing from the spirit and scope of the present application, all of which should be contained within the scope of the claims of the present application.

The invention claimed is:

1. An electric pump, comprising: a stator assembly, wherein the stator assembly comprises a stator iron core and a winding, wherein the winding comprises a main body section, a first section and a second section, wherein the first section is connected to the second section by the main body section, and the first section is located above the second section; the stator iron core comprises an iron core toothed portion, an iron core yoke portion and an iron core neck portion, wherein the iron core toothed portion is connected to the iron core yoke portion by the iron core neck portion, the iron core yoke portion is farther away from a center axis of the stator iron core than the iron core toothed portion, the iron core yoke portion is located on an outer circumference of the winding, and the iron core neck portion is configured to provide support for the winding to wind; wherein an upper end of the main body section is flush with an upper end of a body portion of the iron core yoke portion, and a lower end of the main body section is flush with a lower end of the body portion of the iron core yoke portion; the electric pump further comprises a shield member, wherein the shield member is made of a conductive metal, and at least part of the shield member is located on an outer circumference of at least one of the first section and the second section, wherein the shield member comprises a cylinder portion and a cover portion, wherein the cylinder portion is connected t the cover portion, and the cylinder portion is arranged around the outer circumference of at least one of the first section and the second section;

wherein an Insulating frame comprises a first blocking portion, a second blocking portion and a winding portion, wherein at least part the stator iron core is located between the first blocking portion and the second blocking portion, the first blocking portion, the stator Iron core and the second blocking portion are distributed along an axial direction of the electric pump, and the winding is wound on the winding portion; the first blocking portion is connected to an end of the top of the winding portion, and the second blocking portion is connected to an end of a bottom of the winding portion; and at least part of the shield member is located on an outer circumference of at least one of the first blocking portion and the second blocking portion, wherein the cover portion comprises a first surface and a second surface, wherein the second surface is closer to the winding than the first surface: the electric pump further comprises a first elastic pad, wherein at least part of the first elastic pad is located between the second surface and the insulating frame; and at least one of the insulating frame and the second surface abuts against an end surface of the first elastic pad.

2. The electric pump according to claim 1, wherein the shield member arranged on the outer circumference of the first section is defined as a first shield member when at least part of the shield member is arranged on the outer circumference of the first section, the cylinder portion of the first shield member is defined as a first cylinder portion, the cover portion of the first shield member is defined as a first cover portion, the first cylinder portion is arranged around the outer circumference of the first section, and the first cover portion covers at least the top of the first section;

the shield member arranged on the outer circumference of the second section is defined as a second shield member when at least part of the shield member is arranged on the outer circumference of the second section, the cylinder portion of the second shield member is defined as a second cylinder portion, the cover portion of the second shield member is defined as a second cover portion, the second cylinder portion is arranged around the outer circumference of the second section, and the second cover portion covers at least the bottom of the second section.

3. The electric pump according to claim 1, wherein the electric pump further comprises a rotor assembly and an isolation portion, wherein the electric pump comprises a pump inner chamber, the pump inner chamber comprises a first chamber and a second chamber, the first chamber is located on one side of the isolation portion, the second chamber is located on another side of the isolation portion, the rotor assembly is located in the first chamber, and the stator assembly is located in the second chamber; the electric pump further comprises a second elastic pad, wherein one end of the second elastic pad abuts against the first surface, another end of the second elastic pad abuts against the isolation portion, and the second elastic pad is pressed along the axial direction of the electric pump by a positive pressure acting on the second elastic pad through the isolation portion.

4. The electric pump according to claim 1, wherein the electric pump comprises a first housing, the first housing comprises an accommodating chamber, at least part of the stator assembly is located in the accommodating chamber, the electric pump further comprises a second elastic pad, one end of the second elastic pad abuts against the first surface, another end of the second elastic pad abuts against the first housing, and the second elastic pad is pressed along the axial direction of the electric pump by a positive pressure acting on the second elastic pad through the first housing.

5. The electric pump according to claim 3, wherein the cover portion comprises a plurality of first through holes, the plurality of first through holes extend through an upper surface and a lower surface of the cover portion; the first elastic pad and the second elastic pad are formed by injection molding with at least the shield member as an insert, the first elastic pad and the second elastic pad are connected by a connecting portion, and at least part of the connecting portion is located in the plurality of first through holes.

6. The electric pump according to claim 2, wherein the iron core yoke portion further comprises a protruding portion, wherein the protruding portion protrudes from an outer circumferential surface of the body portion of the stator iron core along a radial direction of the stator iron core; the cylinder portion comprises a notch portion, the notch portion extends through an outer circumferential surface and an inner circumferential surface of the cylinder portion along a radial direction of the shield member, wherein along an axial direction of the shield member, a notch of the notch portion faces the stator iron core, at least part of the protruding portion is located in the notch of the notch portion, and a gap is defined between a side surface of the notch portion and a side surface of the protruding portion.

7. The electric pump according to claim 1, wherein the electric pump comprises a first housing, wherein the first housing comprises an accommodating portion, at least part of the stator assembly is located in a chamber of the accommodating portion, and the first housing is formed by injection molding with at least the shield member as an insert; the shield member comprises a cylinder portion, and the cylinder portion is arranged around the outer circumference of at least one of the first section and the second section.

8. The electric pump according to claim 7, wherein the cylinder portion is arranged around the outer circumference of the first section; a side wall of the accommodating portion comprises a first side wall and a second side wall, wherein the first side wall is located above the second side wall, and a diameter of the first side wall is larger than a diameter of the second side wall; the first housing comprises at least two protruding ribs, wherein the at least two protruding ribs are distributed along a circumferential direction of the first housing, part of each protruding rib is arranged to protrude from part of the side wall of the accommodating portion toward a center axis of the first housing along a radial direction of the first housing, and the at least two protruding ribs extend along an axial direction of the first housing; each protruding rib comprises a first root portion and a second root portion, wherein the first root portion is located on the first side wall, part of the second root portion is located on the second side wall, another part of the second root portion abuts against an inner wall of the cylinder portion, the first root portion is matched with a hole portion in shape, and at least part of a portion, protruding from the first root portion, of each protruding rib is located in the hole portion.

9. The electric pump according to claim 7, wherein the shield member comprises a flange portion, wherein the flange portion is connected to the cylinder portion, an outer circumferential surface of the cylinder portion is closer to a center axis of the shield member than an outer circumferential surface of the flange portion; the flange portion comprises a recessed portion, wherein the recessed portion is recessed from the outer circumferential surface of the flange portion toward the center axis of the shield member along a radial direction of the shield member, and the recessed portion extends through an upper surface and a lower surface of the flange portion along an axial direction of the shield member.

10. The electric pump according to claim 7, wherein the cylinder portion is arranged around the outer circumference of the second section; a side wall of the accommodating portion comprises a first side wall and a second side wall, wherein the first side wall is located above the second side wall, and a diameter of the first side wall is smaller than a diameter of the second side wall; the first housing comprises at least two protruding ribs, wherein the at least two protruding ribs are distributed along a circumferential direction of the first housing, part of each protruding rib is arranged to protrude from part of the side wall of the accommodating portion toward a center axis of the first housing along a radial direction of the first housing, and the at least two protruding ribs extend along an axial direction of the first housing; each protruding rib comprises a first root portion, a second root portion and a third root portion, wherein part of the first root portion is located on the first side wall, another part of the first root portion abuts against part of an inner wall of the cylinder portion, the third root portion abuts against another part of the inner wall of the cylinder portion, the second root portion is located on the second side wall, the second root portion is matched with a hole portion in shape, and at least part of a portion, protruding from the second root portion, of each protruding rib is located in the hole portion.

11. The electric pump according to claim 1, wherein the electric pump further comprises a rotor assembly and an isolation portion, wherein the electric pump comprises a pump inner chamber, the pump inner chamber comprises a first chamber and a second chamber, the first chamber is located on one side of the isolation portion, the second chamber is located on another side of the isolation portion, the rotor assembly is located in the first chamber, and the stator assembly is located in the second chamber; the electric pump further comprises a second elastic pad, wherein one end of the second elastic pad abuts against the first surface, another end of the second elastic pad abuts against the isolation portion, and the second elastic pad is pressed along the axial direction of the electric pump by a positive pressure acting on the second elastic pad through the isolation portion.

12. The electric pump according to claim 1, wherein the electric pump comprises a first housing, the first housing comprises an accommodating chamber, at least part of the stator assembly is located in the accommodating chamber, the electric pump further comprises a second elastic pad, one end of the second elastic pad abuts against the first surface, another end of the second elastic pad abuts against the first housing, and the second elastic pad is pressed along the axial direction of the electric pump by a positive pressure acting on the second elastic pad through the first housing.

13. The electric pump according to claim 4, wherein the cover portion comprises a plurality of first through holes, the plurality of first through holes extend through an upper surface and a lower surface of the cover portion; the first elastic pad and the second elastic pad are formed by injection molding with at least the shield member as an insert, the first elastic pad and the second elastic pad are connected by a connecting portion, and at least part of the connecting portion is located in the plurality of first through holes.

14. The electric pump according to claim 11, wherein the cover portion comprises a plurality of first through holes, the plurality of first through holes extend through an upper surface and a lower surface of the cover portion; the first elastic pad and the second elastic pad are formed by injection molding with at least the shield member as an insert, the first elastic pad and the second elastic pad are connected by a connecting portion, and at least part of the connecting portion is located in the plurality of first through holes.

15. The electric pump according to claim 12, wherein the cover portion comprises a plurality of first through holes, the plurality of first through holes extend through an upper surface and a lower surface of the cover portion; the first elastic pad and the second elastic pad are formed by injection molding with at least the shield member as an insert, the first elastic pad and the second elastic pad are connected by a connecting portion, and at least part of the connecting portion is located in the plurality of first through holes.

16. The electric pump according to claim 8, wherein the shield member comprises a flange portion, wherein the flange portion is connected to the cylinder portion, an outer circumferential surface of the cylinder portion is closer to a center axis of the shield member than an outer circumferential surface of the flange portion; the flange portion comprises a recessed portion, wherein the recessed portion is recessed from the outer circumferential surface of the flange portion toward the center axis of the shield member along a radial direction of the shield member, and the recessed portion extends through an upper surface and a lower surface of the flange portion along an axial direction of the shield member.

* * * * *